(12) United States Patent
Strope et al.

(10) Patent No.: US 11,188,824 B2
(45) Date of Patent: Nov. 30, 2021

(54) COOPERATIVELY TRAINING AND/OR USING SEPARATE INPUT AND SUBSEQUENT CONTENT NEURAL NETWORKS FOR INFORMATION RETRIEVAL

(71) Applicant: Google Inc., Mountain View, CA (US)

(72) Inventors: Brian Strope, Palo Alto, CA (US); Yun-hsuan Sung, Mountain View, CA (US); Matthew Henderson, Redwood City, CA (US); Rami Al-Rfou', Mountain View, CA (US); Raymond Kurzweil, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 1208 days.

(21) Appl. No.: 15/476,280

(22) Filed: Mar. 31, 2017

(65) Prior Publication Data

US 2018/0240013 A1 Aug. 23, 2018

Related U.S. Application Data

(60) Provisional application No. 62/460,554, filed on Feb. 17, 2017.

(51) Int. Cl.
*G06N 3/08* (2006.01)
*G06N 5/04* (2006.01)
(Continued)

(52) U.S. Cl.
CPC ............. *G06N 3/084* (2013.01); *G06F 16/00* (2019.01); *G06F 16/335* (2019.01);
(Continued)

(58) Field of Classification Search
CPC ........ G06N 3/084; G06N 5/04; G06N 3/0454; G06N 3/0445; G06F 16/00; G06F 16/335
(Continued)

(56) References Cited

U.S. PATENT DOCUMENTS 6,490,573 B1 12/2002 Njemanze
8,131,786 B1 3/2012 Bengio et al.
(Continued)

FOREIGN PATENT DOCUMENTS

CN 106407311 2/2017

OTHER PUBLICATIONS

Jaech et al. (Match-Tensor: a Deep Relevance Model for Search Jan. 2017) (Year: 2017).*
(Continued)

*Primary Examiner* — Lut Wong
(74) *Attorney, Agent, or Firm* — Middleton Reutlinger

(57) ABSTRACT

Systems, methods, and computer readable media related to information retrieval. Some implementations are related to training and/or using a relevance model for information retrieval. The relevance model includes an input neural network model and a subsequent content neural network model. The input neural network model and the subsequent content neural network model can be separate, but trained and/or used cooperatively. The input neural network model and the subsequent content neural network model can be "separate" in that separate inputs are applied to the neural network models, and each of the neural network models is used to generate its own feature vector based on its applied input. A comparison of the feature vectors generated based on the separate network models can then be performed, where the comparison indicates relevance of the input
(Continued)

applied to the input neural network model to the separate input applied to the subsequent content neural network model.

14 Claims, 11 Drawing Sheets

(51) Int. Cl.
    *G06F 16/00*     (2019.01)
    *G06N 3/04*     (2006.01)
    *G06F 16/335*     (2019.01)

(52) U.S. Cl.
    CPC ............. *G06N 3/0454* (2013.01); *G06N 5/04* (2013.01); *G06N 3/0445* (2013.01)

(58) Field of Classification Search
    USPC .......................................................... 706/25
    See application file for complete search history.

(56) References Cited

U.S. PATENT DOCUMENTS

| | | | |
|---|---|---|---|
| 2004/0078190 A1* | 4/2004 | Fass | G06F 16/38 704/7 |
| 2011/0264640 A1 | 10/2011 | Fontoura et al. | |
| 2013/0073632 A1 | 3/2013 | Fedorov et al. | |
| 2013/0111348 A1 | 5/2013 | Gruber et al. | |
| 2014/0122388 A1* | 5/2014 | Bai | G06N 20/00 706/12 |
| 2014/0214960 A1 | 7/2014 | Allen et al. | |
| 2015/0161172 A1 | 6/2015 | Bengio et al. | |
| 2015/0169991 A1 | 6/2015 | Zhang | |
| 2018/0166077 A1 | 6/2018 | Yamaguchi et al. | |
| 2018/0174020 A1 | 6/2018 | Wu | |

OTHER PUBLICATIONS

He, J. et al., "Deep Reinforcement Learning with a Natural Language Action Space;" Cornell University; arXiv.org arXiv:1511.04636v5; 15 pages; Jun. 8, 2016.
Yan. et al.; Learning to Respond with Deep Neural Networks for Retrieval-Based Human-Computer Conversation System; 10 pages; dated Jul. 2016.
European Patent Office: Examination Report issued in Application No. 18708284.7 dated Aug. 21, 2020.
International Search Report and Written Opinion of PCT Ser. No. PCT/US2018/018392; 20 pages dated Apr. 13, 2018.
Grbovic et al.; "Context- and Content-aware Embeddings for Query Rewriting in Sponsored Search," Proceedings of the 38th International ACM SIGIR Conference on Research and Development in Information Retrieval; 10 pages. Jan. 2, 2015.
Neculoiu et al; "Learning Text Similarity with Siamese Recurrent Networks," Proceedings of the 1st Workshop on Representation Learning for NLP; 10 pages. Aug. 11, 2016.
Das, et al.; Together We Stand: Siamese Networks for Similar Question Retrieval; Proceedings of the 54th Annual Meeting of the Association for Computational Linguistics (vol. 1: long papers), 12 pages. Aug. 12, 2016.
Gordo et al.; "Deep Image Retrieval: Learning Global Representations for Image Search," ECCV 2016 Conference; [Lecture Notes in Computer Science]; Springer International Publishing, 17 pages. Sep. 17, 2016.
Prakash et al., "Emulating Human Conversations Using Convolutional Neural Network-based IR", arxiv. org, Cornell University Library, Ithaca, NY, 6 pages. Jun. 22, 2016.
Kang et al., "A Short Texts Matching Method Using Shallow Features and Deep Features", Communications in Computerand Information Science, Springer, DE, ISSN: 1865-0929, vol. 496, 10 pages. Jan. 1, 2014.

He et al., "Deep Reinforcement Learning with an Action Space Defined by Natural Language", ICLR 2016 workshop, 18 pages, retrieved from the internet: URL:https://openreview.net/pdf?id=WL9AjgWvPf5zMX2Kfoj5. Feb. 14, 2016.
Abadi, et al.; Tensorflow: A system for Large-scale Machine Learning; In USENIX Symposium on Operating Systems Design and Implementation (OSDI), 20 Pages; dated 2016.
Al-Rfou, et al.; Conversational Contextual Cues: The Case of Personalization and History for Response Ranking; 10 Pages; US; dated Jun. 1, 2016.
Auvolat, et al.; Clustering is Efficient for Approximate Maximum Inner Product Search; 10 Pages; dated Nov. 30, 2015.
Gray, R. M.; Vector Quantization; pp. 205-231; dated 1984.
Guo, R.; et al.; Quantization Based Fast Inner Product Search; In International Conference on Artificial Intelligence and Statistics; pp. 482-490; dated 2016.
He, H. et al.; Multi-perspective Sentence Similarity Modeling with Convolutional Neural Networks; Empirical Methods on Natural Language Processing; pp. 1576-1586; dated Sep. 2015.
Henderson, M. et al.; Word-Based Dialog State Tracking with Recurrent Neural Networks; Department of Engineering and University of Cambridge; pp. 292-299; UK; dated Jun. 2014.
Hochreiter, S.; Long Short-term Memory; Neural Computation; 46 Pages; dated Nov. 1997.
Huang et al. Learning Deep Structured Semantic Models for Web Search Using Clickthrough Data, 8 Pages; dated 2013.
Jegou, H. et al. Product Quantization for Nearest Neighbor Search. Pattern Analysis and Machine Intelligence, 33(1), 15 pages; dated 2011.
Kannan, A. et al.; Smart Reply: Automated Response Suggestion for Email. In Conference on Knowledge Discovery and Data Mining (KDD). ACM; dated 2016.
Kurzweil, R.; How to Create a Mind: The Secret of Human Thought Revealed. Penguin Books, New York, US; dated 2013.
Le, Q. V. et al. Distributed Representations of Sentences and Documents. In International Conference on Machine Learning (ICML); dated 2014.
Mesnil, G. et al.; Using Recurrent Neural Networks for Slot Filling in Spoken Language Understanding; 14 Pages; dated 2015.
Mikolov, T. et al.; Efficient Estimation of Word Representations in Vector Space, pp. 1-12; dated 2013.
Norouzi, M. et al.; Cartesian K-means. In Conference on Computer Vision and Pattern Recognition; pp. 3017-3024, CA; dated 2013.
Pennington, J. et al. Glove: Global Vectors for Word Representation. In Empirical Methods on Natural Language Processing; pp. 1532-1543; US; dated 2014.
Price, P. J.; Evaluation of Spoken Language Systems: The ATIS Domain. In Workshop on Speech and Natural Language. Association for Computational Linguistics; pp. 91-95; dated 1990.
Serban, I. V et al.; Building End-To-End Dialogue Systems Using Generative Hierarchical Neural Network Models. In Conference on Artificial Intelligence, pp. 3776-3783; CA; dated 2016.
Shazeer, N. et al.; Swivel: Improving Embeddings by Noticing What's Missing; 9 pages; US; dated Feb. 6, 2016.
Shen, F.et al.; Learning Binary Codes for Maximum Inner Product Search. In International Conference on Computer Vision; pp. 4148-4156; dated 2015.
Shrivastava, A. et al.; LSH (ALSH) for Sublinear Time Maximum Inner Product Search (MIPS). In Advances in neural information processing systems (NIPS); pp. 1-9; US; dated 2014.
Sutskever, I. et al.; Sequence to Sequence Learning with Neural Networks. In Advances in neural information processing systems (NIPS); pp. 1-9; dated 2014.
O. Vinyals, et al. Grammar as a Foreign Language. In Advances in Neural Information Processing Systems (NIPS) 3 pages; dated Jul. 22, 2015.
Vinyals, O. et al. A Neural Conversational Model. In International Conference on Machine Learning (ICML); pp. 1-9; dated 2015.
Wen, T.H., et al. A Network-Based End-To-End Trainable Task-Oriented Dialogue System; 12 pages; UK; dated Apr. 24, 2016.
Williams, J. D. et al. End-to-end LSTM-based Dialog Conlrol Optimized With Supervised And Reinforcement Learning; 10 pages; US; dated Jun. 3, 2016.

(56) References Cited

OTHER PUBLICATIONS

Wu, Y. et al. Google's Neural Machine Translation System: Bridging the Gap between Human and Machine Translation; pp. 1-23; dated Oct. 8, 2016.
Yao, K. et al. Recurrent Neural Networks for Language Understanding; In Interspeech; pp. 2524-2528; dated 2013.
Yin, W. et al. ABCNN: Attention-based Convolutional Neural Network for Modeling Sentence Pairs; Transactions of the Association for Computational Linguistics; 15 pages; dated Apr. 9, 2016.
Young, S.; Talking to Machines (statistically speaking); In Interspeech 8 pages; GB; dated 2002.

* cited by examiner

COOPERATIVELY TRAINING AND/OR USING SEPARATE INPUT AND SUBSEQUENT CONTENT NEURAL NETWORKS FOR INFORMATION RETRIEVAL

BACKGROUND

Various information retrieval techniques have been proposed. For example, some techniques use keyword matching to identify resources that are responsive to a search query and/or to rank the identified resources. For instance, for a query of "family friendly shows", resources may be identified based on those resources including (and being indexed by) one or more of the search query terms "family", "friendly", and "shows". Moreover, the ranking of a given identified resource may be based on the frequency, position, and/or other characteristic of those term(s) in the given resource. As another example, some information retrieval techniques may additionally or alternatively rank a given identified resource based on a quantity and/or quality of incoming and/or outgoing links of the given resource.

SUMMARY

Implementations of this specification are directed to systems, methods, and computer readable media related to information retrieval. Some implementations are related to training and/or using a relevance model for information retrieval. The relevance model includes an input neural network model and a subsequent content neural network model. The input neural network model and the subsequent content neural network model can be separate. Although separate, as described herein they are trained cooperatively and used cooperatively. The input neural network model and the subsequent content neural network model can be "separate" in that separate inputs are applied to the neural network models, and each of the neural network models is used to generate its own feature vector based on its applied input. A comparison of the feature vectors generated based on the separate network models can then be performed, where the comparison indicates relevance of the input applied to the input neural network model to the separate input applied to the subsequent content neural network model. In some implementations, the comparison of the feature vectors generated by the separate network models is a dot product of the feature vectors, which results in a scalar value that indicates the relevance. For instance, the dot product can result in a scalar value from 0 to 1, where the magnitude of the scalar value indicates the relevance.

During training of the relevance model, training instances are utilized that each include at least an input representation of "initial content", and a subsequent content representation of "subsequent content". For positive training instances, the subsequent content is utilized based on it being indicated as actually being "subsequent" to the initial content. For example, based on it being subsequent to the initial content in one or more electronic resources. For example, the subsequent content may be a subsequent text segment (e.g., a sentence) that follows (e.g., immediately follows) initial content that is a separate text segment (e.g., another sentence). As another example, the subsequent content may be a response to the initial content. For instance, the initial content may be all or portions of an earlier in time comment (e.g., a comment on a thread of an online discussion website, a comment to an online article or blog entry), and the subsequent content may be all or portions of a later in time comment that is responsive to that comment. Also, for instance, the initial content may be all or portions of an earlier in time email, text message, chat message, etc. of a first user to one or more additional users—and the subsequent content may be all or portions of a responsive email, text message, chat message, etc. of one of the additional users. It is noted that "initial" may be used herein to refer to the "initial content" to assist in differentiating from "subsequent content". However, unless indicated otherwise, usage of the word "initial" in "initial content" does not mandate that the "initial content" is the actual first content of a corresponding electronic resource. Rather, it is used to indicate that the "initial content" occurs positionally and/or temporally prior to corresponding "subsequent content".

During training of the relevance model, the input representation of a training instance is applied as input to the input neural network model and an input vector generated over the input neural network model based on that input. Further, the subsequent content representation of a training instance is applied as input to the subsequent content neural network model and a subsequent content vector generated over the subsequent content neural network model based on that input. A relevance value can then be determined based on comparison of the input vector and the subsequent content vector. For example, the relevance value can be based on the dot product of the input vector and the subsequent content vector. For instance, the dot product can result in a value from 0 to 1, with "1" indicating the most relevance and "0" indicating the least relevance. Both the input neural network model and the subsequent content neural network model can then be updated based on comparison of: the training relevance value (and optionally additional training relevance values in batch techniques described herein); and a relevance value indicated by the training instance (e.g., a "1" or other "positive" relevance value for a positive training instance, a "0" or other "negative" relevance value for a negative training instance). For example, an error can be determined based on a difference between the relevance value and the indicated relevance value, and the error backpropagated through both neural networks of the model.

Through such training, each of the two separate neural network models is trained to be utilized independently to derive a corresponding feature vector that provides an implicit semantic representation of a corresponding input. Further, through training on positive instances that include inputs and actual subsequent content, and negative instances that include inputs and subsequent content that is not actual subsequent content, the implicit semantic representation of the corresponding input is grounded in learned differences between: input, subsequent content pairs (and optionally associated subsequent content context) that are actual pairs; and input, subsequent content pairs (and optionally associated subsequent content context) that are not actual pairs. In some implementations, such learned implicit semantic representations may provide improvements in determining that content is relevant to a query and/or in determining a degree of relevance of the content to a query. As one non-limiting example, the trained separate neural networks may be used to determine that a content item (e.g., a text segment) is relevant to an input (e.g., a query) even when the input and the content item include no, or very few, common or synonymous terms.

After training, a representation of a query or other input can be applied as input to the input neural network model, and a query vector generated over the input neural network model based on that input. Further, after training, a text segment or other content item can be applied as input to the subsequent content neural network model, and a content vector generated over the subsequent neural network model based on that input. The query vector can be compared to the content vector to determine a relevance value that indicates relevance of the content item to the input. For example, the relevance value can be based on the dot product of the query vector and the content vector. For instance, the dot product can result in a value from 0 to 1, with "1" indicating the most relevance and "0" indicating the least relevance (and values in between "0" and "1" indicating corresponding degrees of relevance). Such a relevance value can be used in information retrieval in identifying that the content item is responsive to a query and/or in determining a score of the content item for the query. The score of the content item for the query can be used to determine a ranking of a result that is based on the content item. As described in detail herein, the score of a content item for a query may additionally or alternatively be based on other features that are in addition to the relevance value of the content item for the query.

Since the subsequent content neural network model of the relevance model can be independent, in some implementations the subsequent content neural network model can be used to pre-determine content vectors for a plurality of content items, and those content vectors indexed or otherwise stored in association with their corresponding content items. The relevance of a given content item to a query can thus be determined through comparison of a query vector for the query (determined based on the also independent input neural network model) to the pre-stored content vector of the given content item. This obviates the need for a run-time determination of the pre-stored subsequent content vector, thus conserving various computational resources at run-time. In some implementations, query vectors for a plurality of queries may additionally or alternatively be pre-determined and stored in association with their corresponding queries to further increase efficiency at run-time.

Additional description of the training and usage of the relevance model is provided below. Further, description is provided of various additional models, engines, and modules that may be utilized in information retrieval techniques. For example, additional description is provided of training and usage of a quality model, semantic density model, and summarization model. Such models are examples of models that may additionally or alternatively be utilized in various information retrieval techniques.

In some implementations, a method is provided that includes: identifying a plurality of positive training instances that each include an input representation and a subsequent content representation. For each of the positive training instances the input representation is a representation of initial content of a corresponding electronic resource, and the subsequent content representation is a representation of subsequent content of the corresponding electronic resource. In some implementations, the subsequent content is included based on it: being a responsive reply to the initial content in the corresponding electronic resource, or occurring positionally subsequent to the initial content in the corresponding electronic resource. The method further includes training a relevance model based on the positive training instances. Training the relevance model based on a given instance of the positive training instances includes: generating an input vector based on applying the input representation to an input neural network model of the relevance model; generating a subsequent content vector based on applying the subsequent content representation to a subsequent content neural network model of the relevance model; determining a training relevance value based on comparison of the input vector and the subsequent content vector; and updating both the input neural network model and the subsequent content neural network model based on comparison of the training relevance value to a given relevance value indicated by the given instance.

In some implementations, a method is provided that includes: receiving a textual query generated based on user interface input provided by a user via a client device of the user; applying a query representation of the textual query to a trained input neural network model; generating a query vector over the trained input neural network model based on applying the query representation to the trained input neural network model; determining responsive text segments to provide in response to the query based on comparison of the query vector to pre-stored vectors stored in association with the responsive text segments; and providing, to the client device in response to the query, results that are based on the responsive text segments. The trained input neural network model can be trained based on backpropagation that is based on errors during training, where each of the errors is determined during the training as a function of: a corresponding training query vector generated over the trained input neural network model based on a corresponding training instance, and a subsequent content query vector generated over a separate subsequent content neural network model based on the corresponding training instance. Further, the pre-stored vectors for each of the responsive text segments can be generated based on applying a representation of the text segment to the subsequent content neural network model.

In some implementations, a method is provided that includes: receiving a textual query generated based on user interface input provided by a user via a client device of the user; applying a query representation of the textual query to a trained input neural network model; generating a query vector over the trained input neural network model based on applying the query representation to the trained input neural network model; and determining a relevance value that indicates relevance of a content item to the query. Determining the relevance value includes determining the relevance value based on a dot product of the query vector to a vector stored in association with the content item prior to receiving the query. The method further includes, based on the relevance value and in response to the query, providing to the client device a result that is based on the content item.

In some implementations, a method is provided that includes: receiving a textual query generated based on user interface input provided by a user via a client device of the user; applying a query representation of the textual query to a trained neural network model; generating a query vector over the trained neural network model based on applying the query representation to the trained neural network model; and determining a relevance value that indicates relevance of a content item to the query. Determining the relevance value includes: determining the relevance value based on comparison of the query vector to a vector stored in association with the content item. The vector stored in association with the content item is generated based on an additional trained neural network model that is separate from the trained neural network model, but that was trained cooperatively with the trained neural network model based on errors that were a function of both models. The method further includes, based on the relevance value and in response to the query, providing to the client device a result that is based on the content item.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
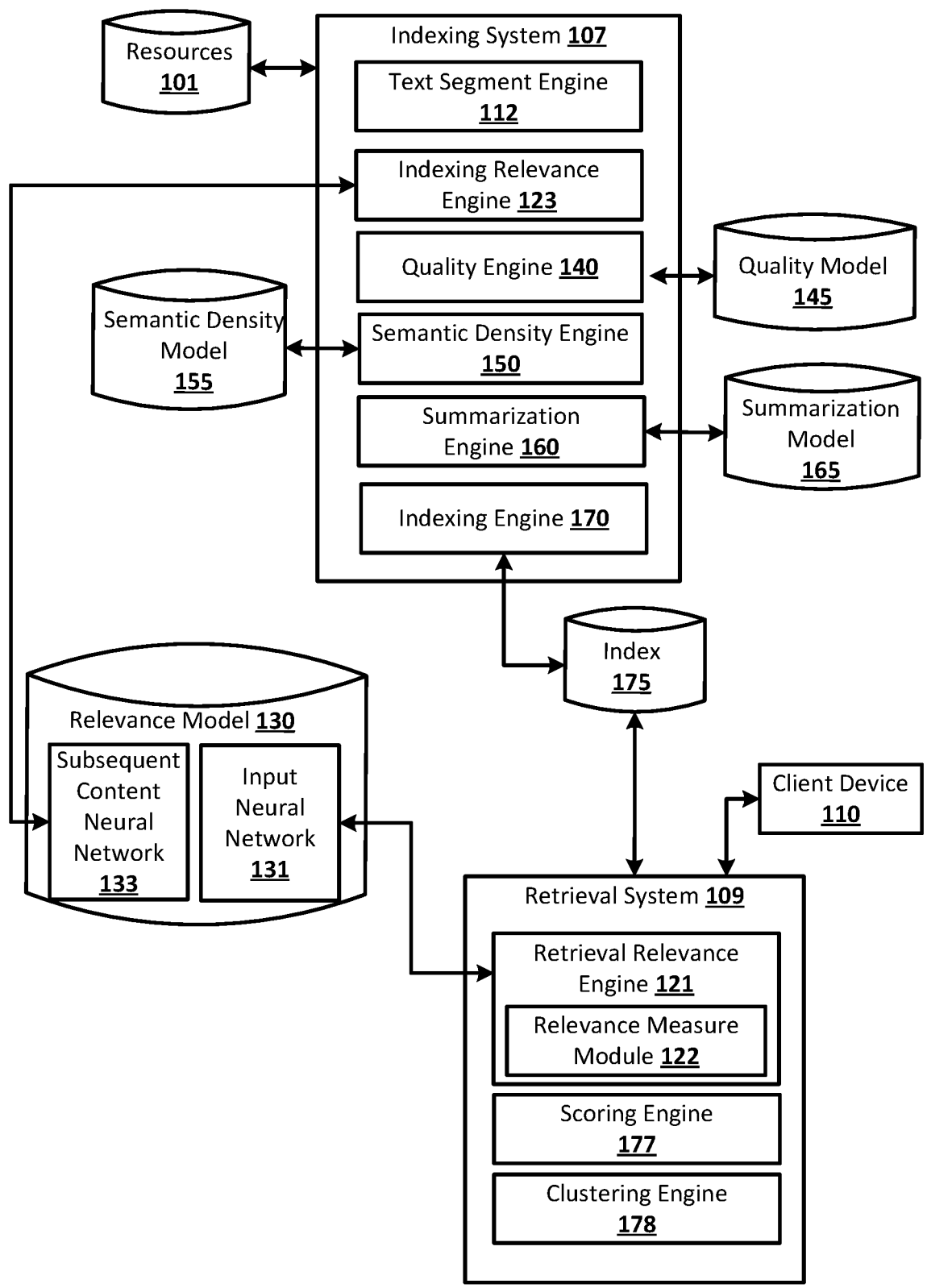
FIG. 1 is a block diagram of an example environment in which implementations disclosed herein may be implemented.

FIG. 1 illustrates a block diagram of an example environment in which implementations disclosed herein may be implemented. The example environment includes an indexing system 107, a retrieval system 109, and a client device 110.

Some non-limiting examples of client device 110 include one or more of: a desktop computing device, a laptop computing device, a tablet computing device, a mobile phone computing device, a computing device of a vehicle, or a wearable apparatus that includes a computing device. Additional and/or alternative client devices may be provided. For various examples herein, client device 110 will be assumed to be a single client device of a user. However, it is understood that retrieval system 109 and/or other components may interface (e.g., via one or more networks) with each of a plurality of client devices and/or other electronic devices of a given user that form a coordinated "ecosystem" of client devices of the given user. Moreover, retrieval system 109 and/or other components may interface with each of a plurality of client devices of multiple users. For example, retrieval system 109 may be a distributed system that receives and responds to queries from multiple users in parallel.

The indexing system 107, the retrieval system 109, and other components described herein may each be implemented in one or more computing devices that communicate, for example, through a network. Each of the computing devices may include one or more components of the example computing device of FIG. 10. The operations performed by one or more components described herein may be distributed across multiple computer systems. For example, the indexing system 107 and/or the retrieval system 109 may be implemented via a distributed cluster of servers.

The indexing system 107 processes resources 101 and generates and maintains an index 175 that indexes the resources 101 and/or content items of the resources 101 based on various features. The resources 101 can include various publicly available resources and/or private resources. Publicly available resources include, for example, Internet resources such as web pages, PDF documents, blogs, discussion boards, public social network postings, public reviews, application content, etc. Private resources are access-restricted to one or more users and can include, for example, electronic communications between users (e.g., chats, emails, social networking communications), word processing documents, PDF documents, private application content, etc. Where access-restricted resources are included in resources 101, the indexing system 107 may only index such resources with permission from the corresponding user(s) and/or may restrict human access to index entries of such resources to the corresponding user(s).

The indexing system 107 may include a text segment engine 112, an indexing relevance engine 123, a quality engine 140, a semantic density engine 150, a summarization engine 160, and an indexing engine 170. In some implementations, one or more of the engines of indexing system 107 may be omitted, combined, and/or implemented in a component that is separate from the indexing system 107.

For a given resource, the text segment engine 112 identifies one or more text segments in the given resource. In some implementations, a text segment includes a sequence of one or more terms. For example, a text segment of a resource can be a sentence, a subset of a sentence, a sequence of terms that is not part of a full sentence, a sequence of terms that includes multiple sentences, a title, etc. As one example, assume a resource is a public product review of a laptop posted by a consumer. The review may include a title of "Good Laptop" and a body that includes: "Nice laptop, but one nitpick. Unfortunately, screen is not good in sun/lots of light. Otherwise, no complaints." The text segment engine 112 may identify text segments of "Good laptop", "Nice laptop, but one nitpick", "Unfortunately, screen is not good in sun/lots of light", and "Otherwise, no complaints". Additionally or alternatively, the text segment engine 112 may identify other subset(s) of the text of the review as text segment(s), or may even identify the entirety of the text of the review as the text segment.

For each identified text segment, the indexing relevance engine 123 applies a representation of the text segment as input to a subsequent content neural network model 133 (also referred to herein and in the figures without "model" for brevity) of relevance model 130. The subsequent content neural network 133 is a deep neural network model that can be stored in one or more computer readable media accessible to the indexing relevance engine 123. As described herein, the indexing relevance engine 123 operates over the subsequent content neural network 133 by applying inputs to the model and generating outputs over the model based on learned parameters of the model.

The representation of the text segment that is applied as input to the subsequent content neural network 133 can take various forms, and will be dependent on the representations used to train the network 133. As one example, the representation of a text segment may be a bag of words embedding of various n-grams (e.g., unigrams, bigrams, trigrams, and/or other n-grams) of the text segment. As another example, all or parts of the text segment may be applied on a token by token basis to a long short-term memory (LSTM) neural network model, and a hidden state of the LSTM model after the application may be used as the representation of the text segment. As yet another example, the representation of the text segment may be based on an embedding of all or parts of the text segment based on another model, such as a GloVE embedding model and/or a Word2Vec embedding model. Additional and/or alternative representations may be utilized.

Regardless of the form of the representation of the identified text segment, the indexing relevance engine 123 generates a vector based on application of the representation to the subsequent content neural network 133. The indexing relevance engine 123 provides the generated vector to the indexing engine 170. The indexing engine 170 stores, in index 175, the vector and an association of the vector to the text segment. Where the text segment is a subset of a resource, the stored association to the text segment can be an association to the resource generally and/or an association to the text segment particularly.

As described herein, in some implementations the indexing relevance engine 123 also applies a context representation of context of the identified text segment as additional input to the subsequent content neural network 133 (e.g., as input to layers that are in addition to, and parallel to, the layers to which the representation of the identified text segment is applied), and generates the vector based also on the application of the context representation. As one example, where the text segment is a sentence in a review, the context of that text segment may be based on a preceding and/or subsequent sentence, a title of the review, a first sentence of the review (where the text segment is not the first sentence), a date of the review, an author of the review, etc. The context representation may take various forms, such as those mentioned above with respect to the text segment.

The quality engine 140 applies the vector generated by the indexing relevance engine 123 as input to a quality model 145. The quality engine 140 generates, over the quality model 145 based on the applied input, an output that is indicative of quality of the text segment. The output may be, for example, a scalar value that is indicative of the quality (e.g., a value from "0" to "1"). Additional description of the quality model 145 is provided below with respect to FIG. 3.

The quality engine 140 provides, to the indexing engine 170, a quality value that is based on (e.g., the same as) the output generated over the quality model 145. The indexing engine 170 stores, in index 175, the quality value and an association of the quality value to the text segment. The stored association to the text segment can be an association to a resource that contains the text segment and/or an association to the text segment particularly.

The semantic density engine 150 applies the vector generated by the indexing relevance engine 123 as input to a semantic density model 155. The semantic density engine 150 generates, over the semantic density model 155 based on the applied input, an output that is indicative of how common the text segment is. The output may be, for example, a scalar value that is indicative of the commonality of the text segment (e.g., a value from "0" to "1" where "0" indicates the most uncommon and "1" indicates the most common).

The semantic density engine 150 provides, to the indexing engine 170, a semantic density value that is based on (e.g., the same as) the output generated over the semantic density model 155. The indexing engine 170 stores, in index 175, the semantic density value and an association of the semantic density value to the text segment. The stored association to the text segment can be an association to a resource that contains the text segment and/or an association to the text segment particularly.

In some implementations, the semantic density model 155 is a Gaussian Mixture model that is fitted to a lower dimensional projection of the vectors for a large quantity of vectors that have been stored in the index 175 (i.e., the vectors generated by the indexing relevance engine 123 for a large quantity of text segments). In this manner, the semantic density model 155 can be utilized to determine how common the vector of a text segment is to other vectors that have been stored in the index 175.

The summarization engine 160 uses a summarization model 165 to generate a summary that provides an indication of the local and/or global context of the text segment. The portion(s) of the summary that provide an indication of the local context can be based on content that is positionally close to the text segment in the resource and the portion(s) that provide an indication of the global context can be based on additional content in the resource. For example, where the text segment is a subset of a comment in an online discussion thread, the summary can provide local context that is based on text segment(s) that immediately precede and/or follow the text segment. Further, the summary can additionally or alternatively provide global context that is based on a title of the discussion thread, a portion of a first comment in the discussion thread, etc.

The summarization engine 160 provides the generated summarization to the indexing engine 170. The indexing engine 170 stores, in index 175, the summarization, and an association of the summarization to the text segment. The stored association to the text segment can be an association to a resource that contains the text segment and/or an association to the text segment particularly.

In some implementations, the summarization model 165 is a deep neural network model that is trained to enable prediction of titles based on a text segment. For example, the summarization engine 160 can apply, as input the summarization model, the text segment and/or a representation of the text segment and generate, over the model based on the input, output that is indicative of a likely title for the text segment. The summarization engine 160 can construct a title based on the output, or can determine an additional text segment, in the resource that contains the text segment, that is most similar to the output (i.e., an additional text segment that is most "title like" for the text segment).

The indexing system 107 generates the index 175 through processing of a large quantity of resources 101 and corresponding text segments. The generated index 175 includes pre-determined values stored in association with each of a plurality of text segments. For example, index 175 can have a stored association of "Text Segment A" to: a relevance vector for Text Segment A, a quality measure for Text Segment A, a semantic density measure for Text Segment A, and a summarization for Text Segment A. The index can have similar stored associations to each of a plurality of (thousands, hundreds of thousands, etc.) additional "Text Segments".

Various techniques may be utilized for storing and/or structuring the associations and/or the values in the index 175. For example, in some implementations, the index 175 is partitioned into multiple shards. In some of those and/or other implementations, the indexing engine 170 determines multiple clusters of vectors generated by the relevance engine 120, seeking to cluster similar vectors together. The indexing engine 170 can build a tree or other structure to enable initial searching for relevant vectors by cluster. Such a tree or other structure can enable searching each cluster first to identify the most relevant cluster(s) as opposed to the more computationally inefficient searching of each vector individually.

The retrieval system 109 uses the index 175 generated by indexing system 107 to determine text segments or other content items that are responsive to a query or other input. The retrieval system 109 includes a retrieval relevance engine 121, a scoring engine 177, and a clustering engine 178. In some implementations, one or more of the engines of retrieval system 109 may be omitted, combined, and/or implemented in a component that is separate from the retrieval system 109.

The retrieval relevance engine 121 receives inputs, such as a text query from client device 110. For each received input, the retrieval relevance engine 120 applies a representation of the input as input to an input neural network model 131 (also referred to herein and in the figures without "model" for brevity) of relevance model 130. The input neural network 131 is a neural network model that can be stored in one or more computer readable media accessible to the retrieval relevance engine 121. As described herein, the retrieval relevance engine 121 operates over the input neural network 131 by applying inputs to the model and generating outputs over the model based on learned parameters of the model. It is noted that the retrieval relevance engine 121 operates over the input neural network 131 to generate corresponding vectors over the network 131, without operating over the subsequent content neural network 133. Likewise, the indexing relevance engine 123 operates over the subsequent content neural network 133 to generate corresponding vectors over the network 133, without operating over the input neural network 131.

The representation of the input that is applied by the retrieval relevance engine 121 as input to the input neural network 131 can take various forms, and will be dependent on the representations used to train the input neural network 131. For example, the representation may take one of the forms described above with respect to the indexing relevance engine 123.

Regardless of the form of the representation of the input, the retrieval relevance engine 121 generates an input vector based on application of the representation to the input neural network 131. The retrieval relevance engine 121 uses the input vector to determine content items in index 175 that are responsive to the input. In particular, the retrieval relevance engine 121 compares the input vector to vectors stored in association with the content items in index 175, to determine content items that are relevant to the input. In some implementations, the retrieval relevance engine 121 determines a threshold quantity of those content items with corresponding vectors that are most similar to the input vector and/or determines those content items having vectors with at least a threshold degree of similarity to the input vector.

As one example, to determine the relevance of a given content item to the input, a relevance measure module 122 of the engine 121 can determine a relevance value based on the result of a dot product between the input vector and the vector stored in association with the given content item. For example, the relevance value can be the scalar result of the dot product. In some implementations, the retrieval relevance engine 121 may determine, as responsive to an input, only content items whose corresponding relevance values satisfy a threshold. In some implementations, the retrieval relevance engine 121 may utilize one or more techniques to obviate the need to search all of the content items based on their associated vectors and/or to obviate the need to determine a dot product between the input vector and the vectors stored in association with each of the content items of index 175. For example, as mentioned above, the index 175 may include multiple clusters of vectors. In such an example, the retrieval relevance engine 121 can compare the input vector to a vector associated with each of one or more clusters (e.g., a mean vector or other representative vector of each cluster) to identify a subset of the vectors that are most relevant to a given input vector. The retrieval relevance engine 121 may then calculate particular relevancy measures for only vectors of the subset. It is noted that in some implementations, by comparing the input vector to vectors associated with each of the clusters, a tree-based and/or other approach may be utilized to enable efficient identification of cluster(s) that are most relevant to the input vector, without necessitating comparison of the input vector to a vector of each and every one of the clusters. For example, only the vectors for a subset of the clusters may be analyzed to efficiently identify one or more potentially relevant clusters, and then optionally dot products determined only for the vectors stored in association with the content items of those cluster(s) (each dot product being between the input vector and the vector of a corresponding content item).

The scoring engine 177 determines scores for each of the relevant content items determined by retrieval relevance engine 121. In some implementations, the score for each of the content items is based on the relevance measure for the content item determined by the relevance measure module 122. In some implementations, the score for each of the content items is additionally or alternatively based on the semantic density value, the quality value, and/or other value(s) stored in association with the content item in the index 175.

The retrieval system 109 provides, in response to an input, one or more results that are based on one or more of the relevant content items. For example, where the input is a query from the client device 110, the retrieval system 109 provides the results to client device 110 for audible and/or graphical presentation via user interface output device(s) of the client device 110. In some implementations, the retrieval system 109 ranks the relevant content items based on the scores determined by the scoring engine 177 and provides the results based on the ranking. For example, the retrieval system 109 can determine a presentation order and/or other prominence of provided results based on the ranking. The result provided for a content item can include, for example, the content item itself, a summary (e.g., a summary stored in the index 175) and/or a link to a resource that contains the content item.

In some implementations, the clustering module 178 clusters the relevant content items based on the vectors associated with the content items, such that similar content items (i.e., content items having similar associated vectors) are grouped into a common cluster. In some of those implementations, the retrieval system 109 can provide the results for presentation based on the clusters. This can include clustering similar results together, promoting diversity of results by ensuring results from multiple clusters are initially presented, and/or presenting links or other selectable elements to enable exploration of the various clusters of results.

Figure 2A:
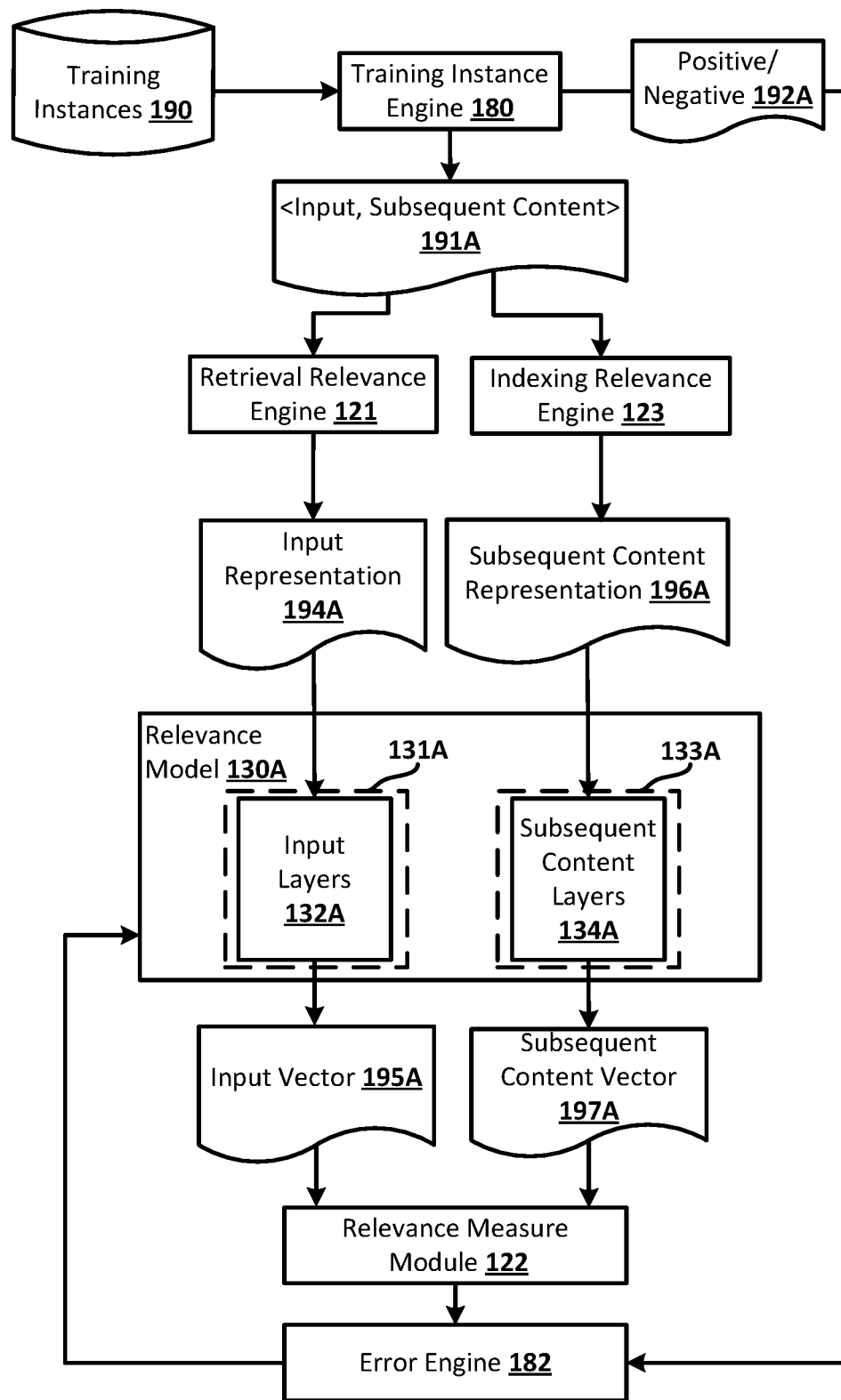
FIG. 2A illustrates an example of training an implementation of the relevance model of FIG. 1.

FIG. 2A illustrates an example of training relevance model 130A, which is an implementation of the relevance model 130 of FIG. 1. In FIG. 2A, a training instance engine 180 retrieves a training instance from training instances database 190. The training instance includes an input, subsequent content pair 191A, and an indication 192A of whether the training instance is a negative or positive training instance (i.e., whether the input, subsequent content pair 191A is a "true" input, subsequent content pair).

As one example, the input of pair 191A may be "I saw a great band last night", the subsequent content of pair 191A may be "They played upbeat dance music", and the indication 192A may be that the training instance is a positive instance. Such a positive training instance can be generated based on, for example, an electronic resource that includes the text segment "I saw a great band last night", positionally followed by the text segment "They played upbeat dance music". As another example, the input of pair 191A may be "I saw a great band last night", the subsequent content of pair 191A may be "The tree looks good to me", and the indication 192A may be that the training instance is a negative instance. Such a negative training instance can be generated based on, for example, a random pairing of text segments. As yet another example, the input of pair 191A may be "How's the battery life", the subsequent content of pair 191A may be "I'm consistently getting a full day's usage", and the indication 192A may be that the training instance is a positive instance. Such a positive training instance can be generated based on, for example, an electronic resource where the text segment "I'm consistently getting a full day's usage" is a responsive reply to an original communication that includes the text segment "How's the battery life".

The retrieval relevance engine 121 (or a separate "training engine") generates an input representation 194A based on the input of the pair 191A. In other implementations, the input representation 194A may be pre-generated and provided in the training instance itself (e.g., in lieu of the input). The input representation 194A can be, for example, a bag of words representation and/or other representation as described herein. The retrieval relevance engine 121 (or a separate "training engine") applies the input representation 194A as input to input layers 132A of the input neural network 131A of relevance model 130A. The retrieval relevance engine 121 generates an input vector 195A over the input layers 132A based on the application of the input representation 194A.

The indexing relevance engine 123 (or a separate "training engine") generates subsequent content representation 196A based on the subsequent content of the pair 191A. In other implementations, the subsequent content representation 196A may be pre-generated and provided in the training instance itself (e.g., in lieu of the subsequent content). The subsequent content representation 196A can be, for example, a bag of words and/or other representation as described herein. The indexing relevance engine 123 (or a separate "training engine") applies the subsequent content representation 196A as input to subsequent content layers 134A of the subsequent content neural network 133A of relevance model 130A. The indexing relevance engine 123 generates a subsequent content vector 197A over the subsequent content layers 134A based on the application of the subsequent content representation 196A.

The relevance measure module 122 determines a relevance measure based on comparison of the input vector 195A and the subsequent content vector 197A. For example, the relevance measure module 122 can determine a relevance measure that is the scalar result of a dot product between the two vectors. It is noted that input vector 195A is generated based on application of the input representation 194A to input layers 132A and is generated independent of the subsequent content layers 134A and the subsequent content representation 196A. Likewise, the subsequent content vector 197A is generated based on application of the subsequent content representation 196A to subsequent content layers 134A and is generated independent of the input layers 132A and the input representation 194A. It is only the outputs (vectors 195A and 197A) generated over the separate input neural network 131A and subsequent content neural network 133A that are compared during training (although such comparison is used to generate an error for backpropagation of both networks 131A and 133A as described below and elsewhere herein).

The relevance measure module 122 provides the relevance measure to the error engine 182. The error engine 182 determines the error (if any) of the relevance measure based on comparison of the relevance measure to the actual relevance measure indicated by the indication 192A. For example, the indication 192A may be a "1" (or other "positive" value) if the training instance is a positive training instance, and a "0" (or other "negative" value) if the training instance is a negative training instance. The error engine 182 then updates both the input neural network 131A and the subsequent content neural network 133A based on the error (and optionally based on other error(s) determined for a batch of training instances, when batch learning is utilized and the training instance of FIG. 2A is part of the batch). For example, the error engine 182 may perform, based on the error and a loss function, backpropagation over the input layers 132A and the subsequent content layers 134A.

Although FIG. 2A is illustrated with respect to a single training instance, it is understood that during training of the relevance model 130A a large quantity of training instances will be utilized in training the relevance model 130A.

Figure 2B:
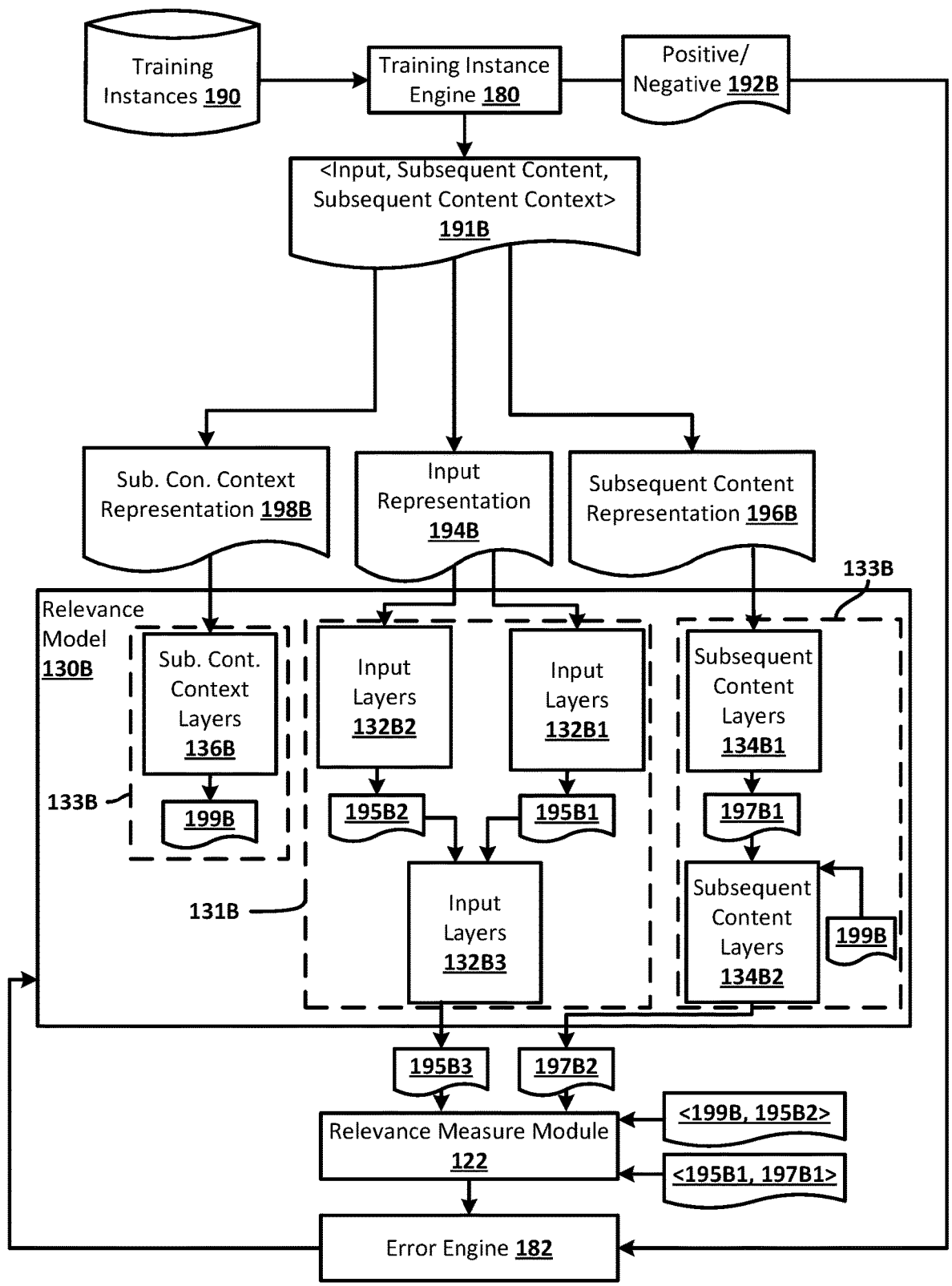
FIG. 2B illustrates an example of training another implementation of the relevance model of FIG. 1.

FIG. 2B illustrates an example of training relevance model 130B, which is another implementation of the relevance model 130 of FIG. 1. In FIG. 2B, the training instance engine 180 retrieves a training instance from training instances database 190. The training instance includes an input, subsequent content, subsequent content context triple 191B. The training instance also includes an indication 192B of whether the training instance is a negative or positive training instance. Although only on instance of subsequent content context is indicated in the triple 191A, in other implementations multiple instances of subsequent content context may be provided in a tuple of a training instance (e.g., additional subsequent content layers can be provided in the subsequent content neural network 133B of model 130B, each handling a different instance of subsequent content context).

The retrieval relevance engine 121 or a separate training engine (neither of which is illustrated in FIG. 2B for simplicity) generates an input representation 194B based on the input of the triple 191B. In other implementations, the input representation 194B may be provided in the training instance itself (e.g., in lieu of the input). The retrieval relevance engine 121 (or separate training engine) applies the input representation 194B as input to first upstream input layers 132B1 of the input neural network 131B of relevance model 130B. The retrieval relevance engine 121 (or separate training engine) also applies the input representation 194B as input to second upstream input layers 132B2 of the input neural network 131B. The first upstream input layers 132B1 are parallel to the second upstream input layers 132B2. The retrieval relevance engine 121 (or separate training engine) generates a first input vector 195B1 over first upstream input layers 132B1 based on the application of the input representation 194B to those layers 132B1. The retrieval relevance engine 121 (or separate training engine) also generates a second input vector 195B2 over second upstream input layers 132B2 based on the application of the input representation 194B to those layers 132B2.

The retrieval relevance engine 121 (or separate training engine) provides, as input to downstream input layers 132B3 of the input neural network 131B, input that is based on a combination of the first input vector 195B1 and the second input vector 195B2. The combination can be a concatenation, an addition, and/or other combination. The retrieval relevance engine 121 (or separate training engine) further generates an overall input vector 195B3 over the downstream input layers 132B3 based on the application of the combination of the first input vector 195B1 and the second input vector 195B2 to those layers 132B3.

The indexing relevance engine 123 or a separate training engine (neither of which is illustrated in FIG. 2B for simplicity) generates a subsequent content representation 196B based on the subsequent content of the triple 191B. The indexing relevance engine 123 (or separate training engine) also generates a subsequent content context representation 198B based on the subsequent content context of the triple 191B. In other implementations, the representations 196B and/or 198B may be provided in the training instance itself. The indexing relevance engine 123 (or separate training engine) applies the subsequent content representation 196B as input to upstream subsequent content layers 134B1 of the subsequent content neural network 133B of relevance model 130B. The indexing relevance engine 123 (or separate training engine) applies the subsequent content context representation 198B as input to upstream subsequent content layers 136B of the subsequent content neural network 133B of relevance model 130B. The layers 136B are parallel to the layers 134B1. The indexing relevance engine 123 (or separate training engine) generates a first subsequent content vector 197B1 over upstream subsequent content layers 134B1 based on the application of the subsequent content representation 196B to those layers 134B1. The indexing relevance engine 123 (or separate training engine) also generates a subsequent content context vector 199B over subsequent content context layers 136B based on the application of the subsequent content context representation 198B to those layers 136B.

The indexing relevance engine 123 (or separate training engine) provides, as input to downstream subsequent content layers 134B2 of the subsequent content neural network 133B, input that is based on a combination of the first subsequent content vector 197B1 and the subsequent content context vector 199B. The combination can be a concatenation, an addition, and/or other combination. The indexing relevance engine 123 (or separate training engine) further generates an overall subsequent content vector 197B2 over the downstream subsequent content layers 134B2 based on the application of the combination of the vectors 197B1 and 199B to those layers 134B2.

The relevance measure module 122 determines a relevance measure based on comparison of the input vector 195B3 and the subsequent content vector 197B2. For example, the relevance measure module 122 can determine a first relevance measure that is the scalar result of a dot product between the two vectors. The relevance measure module 122 also determines a second relevance measure based on comparison of the subsequent content context vector 199B and the second input vector 195B2. The relevance measure module 122 further also determines a third relevance measure based on comparison of the first subsequent content vector 197B1 and the first input vector 195B1.

The relevance measure module 122 provides the three separate relevance measures to the error engine 182. The error engine 182 determines the error (if any) for each of the three relevance measures based on comparison of the relevance measure to the actual relevance measure indicated by the indication 192B. For example, the error engine 182 may determine a first error based on comparison of the first relevance measure to the actual relevance measure, a second error based on comparison of the second relevance measure to the actual relevance measure, and a third error based on comparison of the third relevance measure to the actual relevance measure. The error engine 182 then updates both the input neural network 131B and the subsequent content neural network 133B based on the first, second, and third errors (and optionally based on other error(s) determined for a batch of training instances, when batch learning is utilized and the training instance of FIG. 2B is part of the batch). For example, the error engine 182 can update the input layers 132B3 and subsequent content layers 134B2 based on the first error (that can be based on comparison of the actual relevance measure to the dot product of vectors 195B3 and 197B2). The error engine 182 can update the subsequent content context layers 136B and input layers 132B2 based on the second error (that can be based on comparison of the actual relevance measure to the dot product of vectors 199B and 195B2) and based on any remaining gradient from the application of the first error to the input layers 132B3 and subsequent content layers 134B2. The error engine 182 can also update the subsequent content layers 134B1 and input layers 132B1 based on the third error (that can be based on comparison of the actual relevance measure to the dot product of vectors 197B1 and 195B1) and based on any remaining gradient from the application of the first error to the input layers 132B3 and subsequent content layers 134B2.

The relevance model 130B of FIG. 2B is a multi-loss model that determines each error of the multiple errors based on comparison (e.g., dot product) between output vectors generated over two parallel layers that are "paired", but separate. Such a multi-loss model enables the cooperative training of paired parallel layers. For example, the subsequent content contextual layers 136B and input layers 132B2 are "paired" in the example of FIG. 2B since the error engine 182 determines an error that is based on a dot product of the separate vectors 199B and 195B2 generated over the layers 136B and 132B2—and updates the layers 136B and 132B2 based on that error. For instance, layers 136B and 132B2 can be updated based on that error, whereas the other layers are not. Accordingly, while remaining separate, contextual layers 136B and input layers 132B2 are trained dependent on one another—thereby effectively independently training layers 136B and 132B2 to predict whether "subsequent content context representation, input representation pairs" are relevant to one another. Likewise, the subsequent content layers 134B1 and the input layers 132B1 are trained dependent on one another, while still remaining separate—thereby effectively independently learning to predict whether "subsequent content representation, input representation pairs" are relevant to one another. For example, the error engine 182 determines an error that is based on a dot product of the separate vectors 197B1 and 195B1 generated over the layers 134B1 and 132B1—and updates the layers 134B1 and 132B1 based on that error. For instance, layers 134B1 and 132B1 can be updated based on that error, whereas the other layers are not. The input layers 132B3 and the subsequent content layers 134B2 are also trained dependent on one another, while still remaining separate. For example, the error engine 182 determines an error that is based on a dot product of the separate vectors 195B3 and 197B2 generated over the layers 132B3 and 134B2—and updates the layers 132B3 and 134B2 based on that error. The error engine 182 may further apply any remaining gradient, after updating the layers 132B3 and 134B2, to the upstream layers 132B1, 132B2, 134B1, and 136B.

Although FIG. 2B is illustrated with respect to a single training instance, it is understood that during training of the relevance model 130B, a large quantity of training instances will be utilized. Also, although FIG. 2B is illustrated with a single subsequent context layers, input layers pair—in some implementations multiple subsequent context layers, input layers pairs may be provided and effectively trained together.

Figure 3:
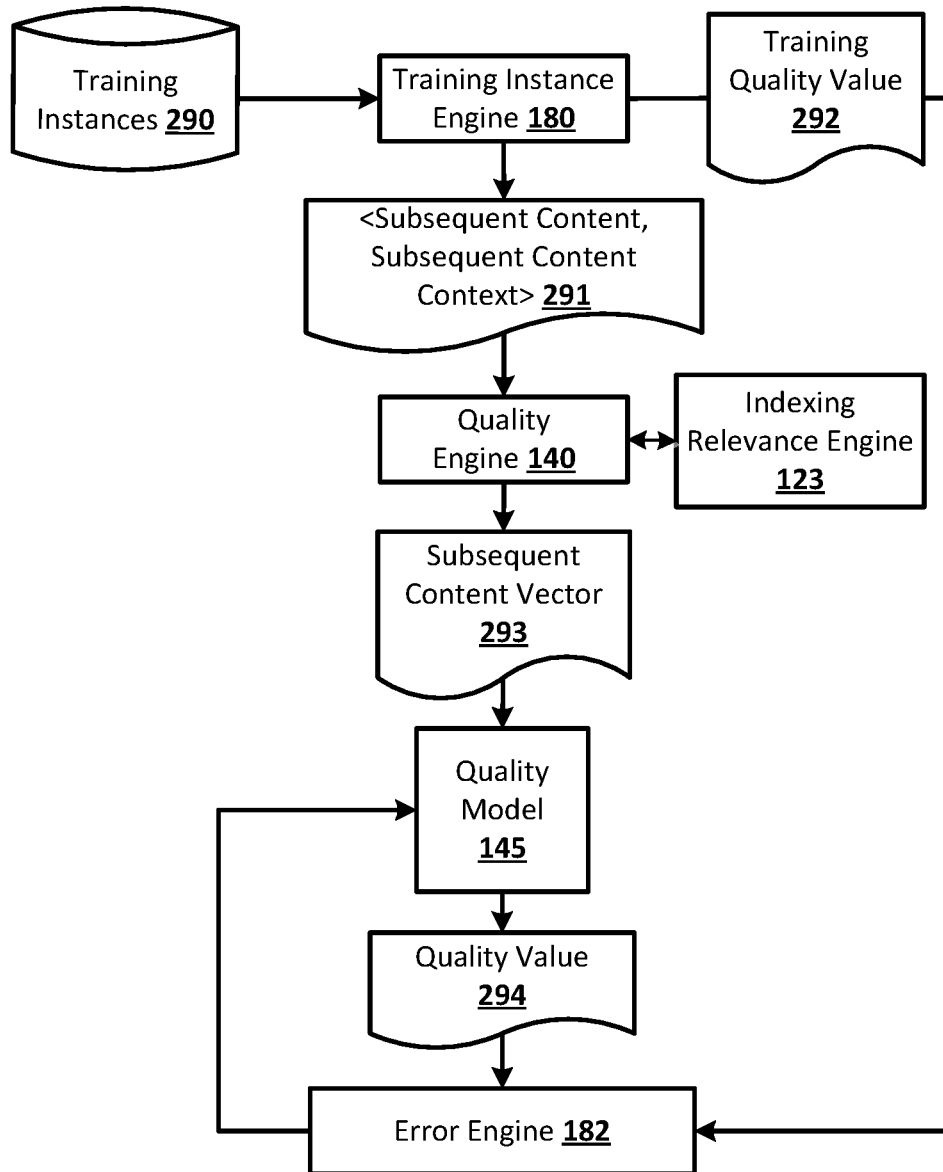
FIG. 3 illustrates an example of training of the quality model of FIG. 1.

FIG. 3 illustrates an example of training of the quality model 145 of FIG. 1. In FIG. 3, the training instance engine 180 retrieves a training instance from training instances database 290. The training instance includes a subsequent content, subsequent content context pair 291, and training quality value 292.

As with FIGS. 2A and 2B, the pair 291 can be based on content of an electronic resource. For example, the subsequent content can be a text segment from a comment in an electronic resource, and the subsequent content context can be other text segments and/or other content from the comment and/or other portions of the electronic resource. The training quality value 292 indicates a level of quality of the training instance. The training quality value 292 can be assigned to the training instance based on various indications of quality of the corresponding subsequent content and/or subsequent content context. For example, where the subsequent content is from a comment in an electronic resource, the training quality value 292 can be based on a quantity of up votes and/or down votes assigned to the comment by various users and/or other explicit or implicit indications of the quality. For instance, where a large quantity of up votes are assigned to the comment, along with minimal down votes, a quality measure of "1" (or other "positive" value) can be assigned to the training quality value 292. In some implementations, training instances 290 may only be utilized if those training instances are determined to have a quality value that indicates at least a threshold level of positive quality or a threshold level of negative quality (e.g., extreme positive quality or extreme negative quality).

The quality engine 140 identifies a subsequent content vector 293 based on the pair 291. For example, the quality engine 140 may communicate with the indexing relevance engine 123 to obtain the subsequent content vector 293. For example, the quality engine 140 may generate the subsequent content vector 293 based on application of representations of the pair 291 to a trained subsequent content neural network, such as the subsequent content neural network 133B of FIG. 2B.

The quality engine 140 applies the subsequent content vector 293 as input to the quality model 145 and generates, over the quality model 145, a quality value 294. For example, the quality model 145 can be a deep neural network model configured to produce an output that is a single scalar value, such as a value from "0" to "1".

The error engine 182 determines the error (if any) of the quality value 294 based on comparison of the quality value 294 to the example quality value 292 of the training instance. The error engine 182 then updates the quality model 145 based on the error (and optionally based on other error(s) determined for a batch of training instances, when batch learning is utilized and the training instance of FIG. 3 is part of the batch).

Although FIG. 3 is illustrated with respect to a single training instance, it is understood that during training of the quality model 145 a large quantity of training instances will be utilized in training the quality model 145. Also, although FIG. 3 is illustrated with respect to a training instance that is a subsequent content, subsequent content context pair, quality model 145 may be trained based on subsequent content (without any corresponding subsequent content context) and/or based on other tuples of features (e.g., each training instance may include multiple instance of subsequent content context).

Figure 4:
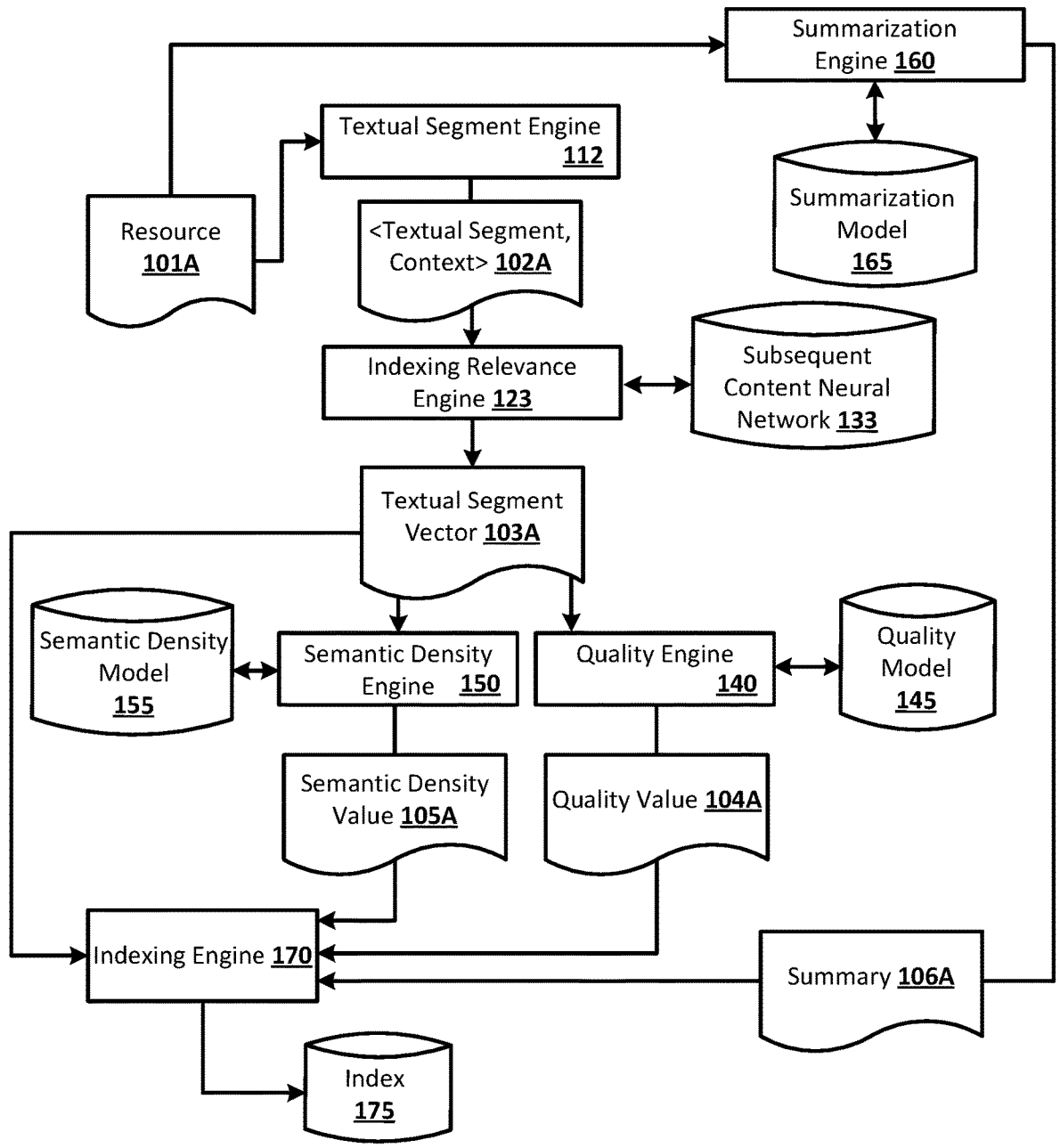
FIG. 4 illustrates an example of generating various features for a content item, and storing the various features in association with the content item.

FIG. 4 illustrates an example of generating various features for a content item, and storing the various features in association with the content item. The textual segment engine 112 identifies a textual segment and context 102A from a resource 101A. The textual segment engine provides the textual segment and the context 102A to the indexing relevance engine 123.

The indexing relevance engine 123 generates a textual segment vector 103A based on applying representations of the textual segment and the context 102A to the subsequent content neural network 133. In particular, the indexing relevance engine 123 generates the textual segment vector 103A over the network 133 based on the applied input. The textual segment vector 103A is provided to the indexing engine 170, and is also provided to the semantic density engine 150 and the quality engine 140.

The semantic density engine 150 determines a semantic density value 105A based on application of the textual segment vector 103A to the semantic density model 155. The quality engine 140 determines a quality value 104A based on application of the textual segment vector 103A to the quality model 145.

The quality value 104A and the semantic density value 105A are provided to the indexing engine 170. The summarization engine 160 also utilize summarization model 165 to generate a summary 106A based on the textual segment and/or other content of the resource 101A, and provides the summary 106A to the indexing engine 170.

The indexing engine 170 stores associations of the textual segment and/or the resource 101A to: textual segment vector 103A, the semantic density value 105A, the quality value 104A, and the summary 106A.

Figure 5:
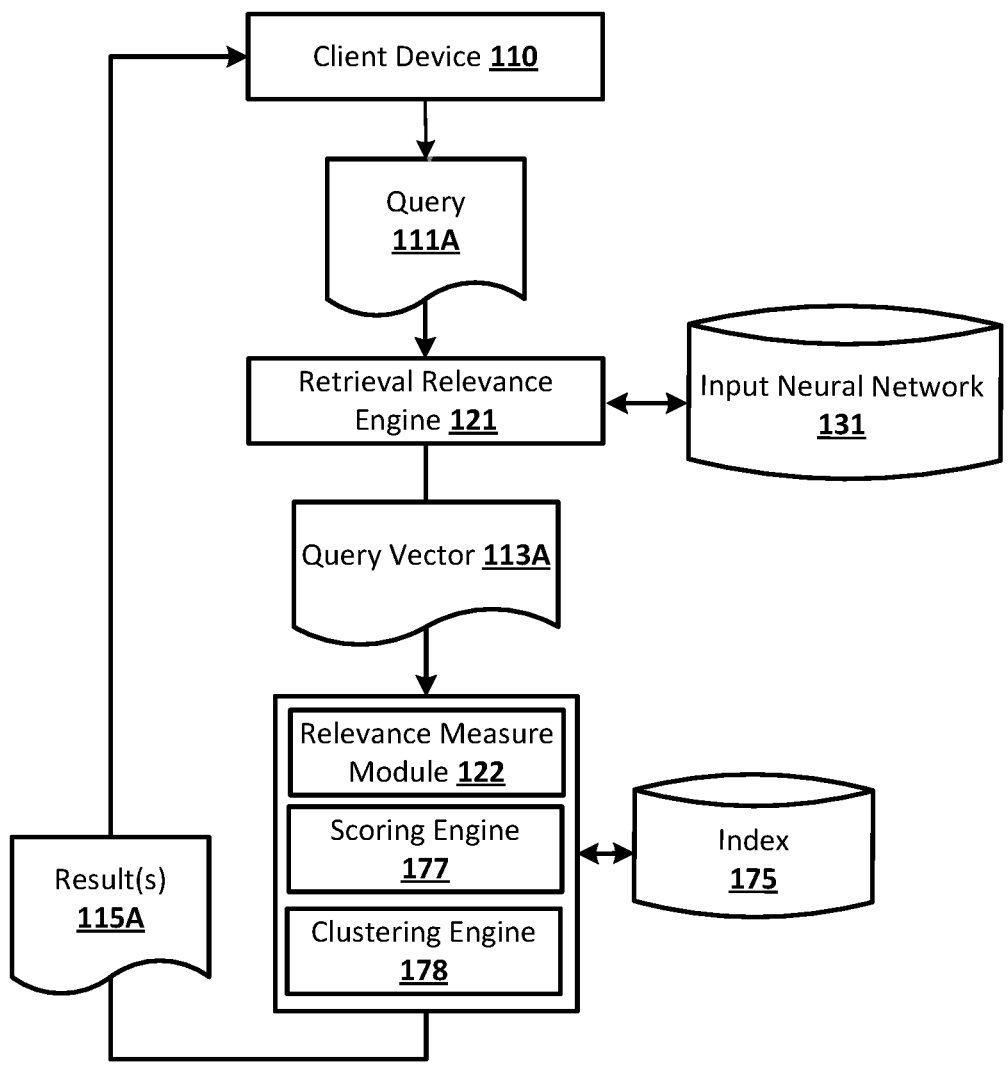
FIG. 5 illustrates an example of generating a query vector based on a received query, identifying content items that are responsive to the query based on comparison of the query vector to vectors indexed with those content items, and providing results in response to the query that are based on the responsive content items.

FIG. 5 illustrates an example of generating a query vector based on a received query, identifying content items that are responsive to the query based on comparison of the query vector to vectors indexed with those content items, and providing results in response to the query that are based on the content items.

In FIG. 5, a query 111A is provided by client device 110 based on user interface input provided by a user at the client device 110. The retrieval relevance engine 121 generates a query vector based on applying representations of the query 111A to the input neural network 131. In particular, the retrieval relevance engine 121 generates the query vector 113A over the network 131 based on the applied input. The relevance measure module 122 compares the query vector 113A to vectors pre-stored in the index (e.g., vector 103A of FIG. 4) to determine corresponding content items that are relevant to the query 111A.

The scoring engine 177 may determine scores for the determined content items based on relevance measures determined by module 122 for the content items (e.g., based on a dot product of the query vector 113A and the corresponding pre-stored vectors). In some implementations, the scoring engine 177 determines the scores based on additional and/or alternative factors, such as additional value(s) pre-stored in the index 175 in association with the content items (e.g., quality values and/or semantic density values).

Clustering engine 178 may optionally cluster determined content items based on similarity between their pre-stored vectors. Results 115A are provided to the client device 110 in response to the query. The results 115A are based on determined content items, and may be provided based on a ranking determined by scoring engine 177 and/or based on cluster(s) determined by clustering engine 178.

Figure 6:
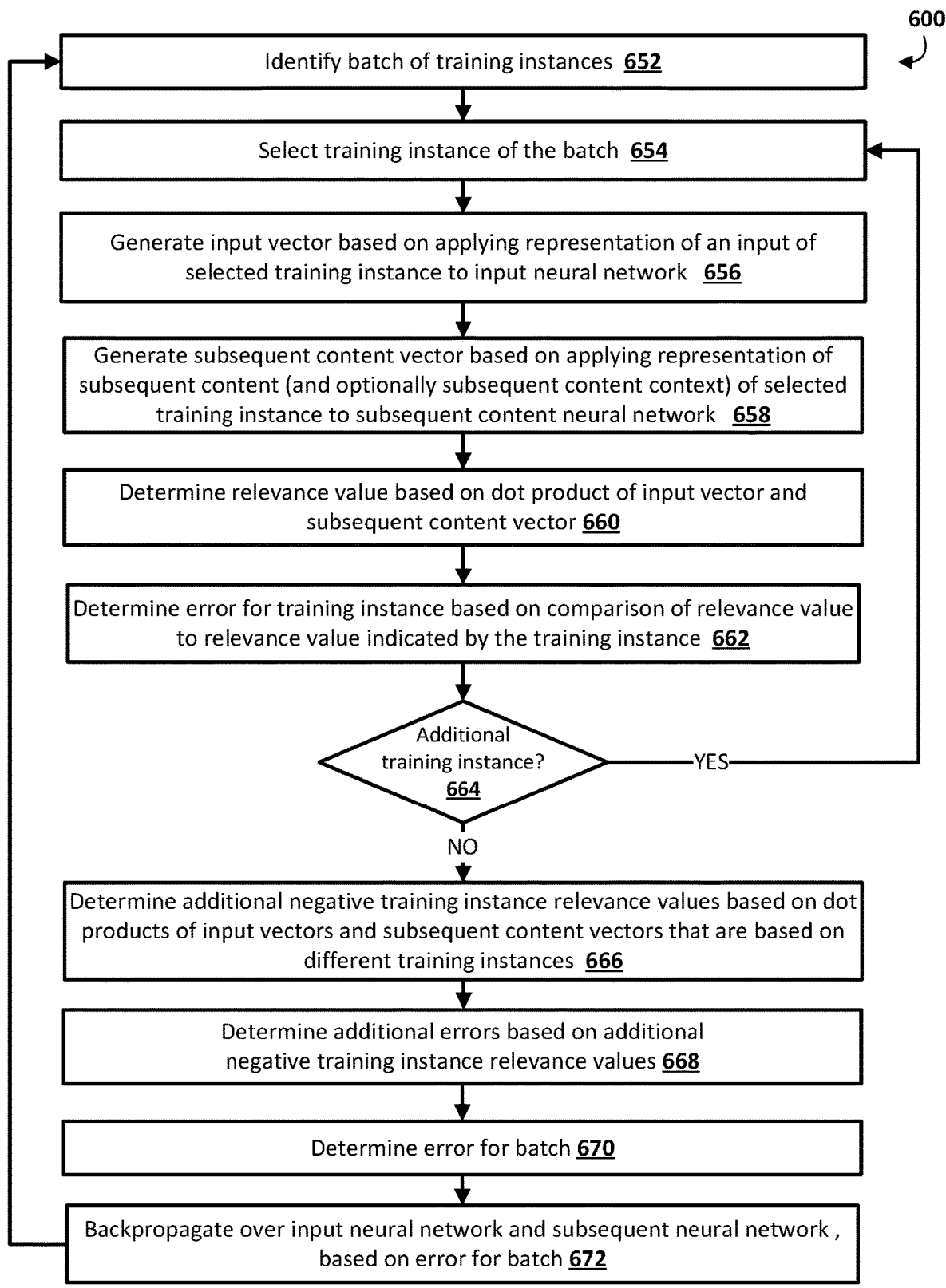
FIG. 6 is a flowchart illustrating a method of training a relevance model according to various implementations disclosed herein.

Turning now to FIG. 6, a flowchart is provided that illustrates an example method 600 of training a relevance model according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 600 are shown in a particular order, this is not meant to be limiting. One or more operations may be reordered, omitted or added.

At block 652, the system identifies a batch of training instances. As a working example, each of the training instances may be a positive training instance with a corresponding input text segment, a corresponding subsequent content text segment, and one or more corresponding subsequent content contexts.

At block 654, the system selects a training instance of the batch.

At block 656, the system generates an input vector based on applying a representation of an input of the selected training instance to an input neural network. Continuing with the working example, the representation of the input may be a bag of words representation of the corresponding input text segment of the selected training instance.

At block 658, the system generates a subsequent content vector based on applying a representation of subsequent content of the selected training instance to a subsequent content neural network. Continuing with the working example, the representation of the subsequent content may be a bag of words representation of the corresponding subsequent content text segment of the selected training instance. In some implementations, block 658 includes generating the subsequent content vector based on also applying a representation of subsequent content context(s) to the subsequent content neural network.

At block 660, the system determines a relevance value based on a dot product of the input vector generated in block 656 and the subsequent content vector generated in block 658.

At block 662, the system determines an error for the training instance based on comparison of the relevance value to a relevance value indicated by the training instance. For example, where the training instance is a positive training instance, the relevance value indicated by the training instance may be "1" or other "positive" value.

At block 664, the system determines whether there are any additional unprocessed training instances in the batch. If so, the system proceeds to block 654 and selects an additional training instance. The system then performs blocks 656, 658, 660, and 662 based on the additional training instance.

If, at an iteration of block 664, the system determines there are not any additional unprocessed training instances in the batch, the system proceeds to block 666.

At block 666, the system determines additional negative training instance relevance values based on dot products of input vectors and subsequent content vectors that are based on different training instances. For example, the system can determine an additional negative training instance relevance value based on a dot product of an input vector generated at block 656 based on a first training instance and a subsequent content vector generated at block 658 based on a different second training instance. By using an input vector and a subsequent content vector generated based on two different training instances, it can be assumed that the corresponding input and subsequent content are not based on "true" pairs of input and subsequent content. Accordingly, it can be assumed that the additional relevance values generated at block 666 are additional "negative" relevance values. Performance of block 666 effectively provides additional negative training instances, while enabling the reuse of previously generated input vectors and subsequent content vectors. In other words, additional negative training instances are effectively obtained without requiring computationally intensive generation of further input vectors and subsequent content vectors.

As one particular example, assume the batch of block 652 consists of 100 positive training instances. After training based on the 100 positive training instances, 100 input vectors and 100 subsequent content vectors have been generated. A first "negative" relevance value can be generated based on the dot product of a first input vector for a first training instance and a second subsequent content vector of a second training instance. A second "negative" relevance value can be generated based on the dot product of the first input vector and a third subsequent content vector of a third training instance. Additional "negative" relevance values can be determined based on dot products of the first input vector and the subsequent content vectors for the fourth through one hundredth training instances. Further, 99 "negative" relevance values can be similarly determined based on the input vector for the second training instance, and the subsequent content vectors of the other training instances (those that are not the second training instance); 99 "negative" relevance values ban be similarly determined based on the input vector for the third training instance, and the subsequent content vectors of the other training instances (those that are not the third training instance); etc. Accordingly, 9,900 "negative" relevance values can be generated through relatively computationally efficient dot product calculations of vectors already generated based on the positive training instances. Further, an overall error can be determined (at block 670 below) that is based on a function of all of the "negative" relevance values (e.g., a softmax function) and the overall error backpropagated (at block 670) over the input neural network and the subsequent content neural network.

At block 668, the system determines additional errors based on the additional negative training instance relevance values determined at block 666. In particular, because the relevance values are determined at block 666 are considered to be for additional negative instances, the system determines the additional errors based on comparison of the negative relevance values of block 666 to a "0" or other "negative" value.

At block 670, the system determines an error for the batch. The error for the batch can be based on the errors determined at iterations of block 662 and at block 668.

At block 672, the system backpropagates over the input neural network and the subsequent neural network based on the error for the batch.

The system may then identify a new batch of training instances, and restart method 600 for the new batch. Such training may continue until one or more criteria are satisfied. Although FIG. 6 illustrates a particular batch training approach, it is understood that non-batch training may additionally or alternatively be utilized in training a relevance model and/or other models described herein. Also, in some implementations blocks 666 and 668 may be omitted and/or other blocks may be omitted or added.

Figure 7:
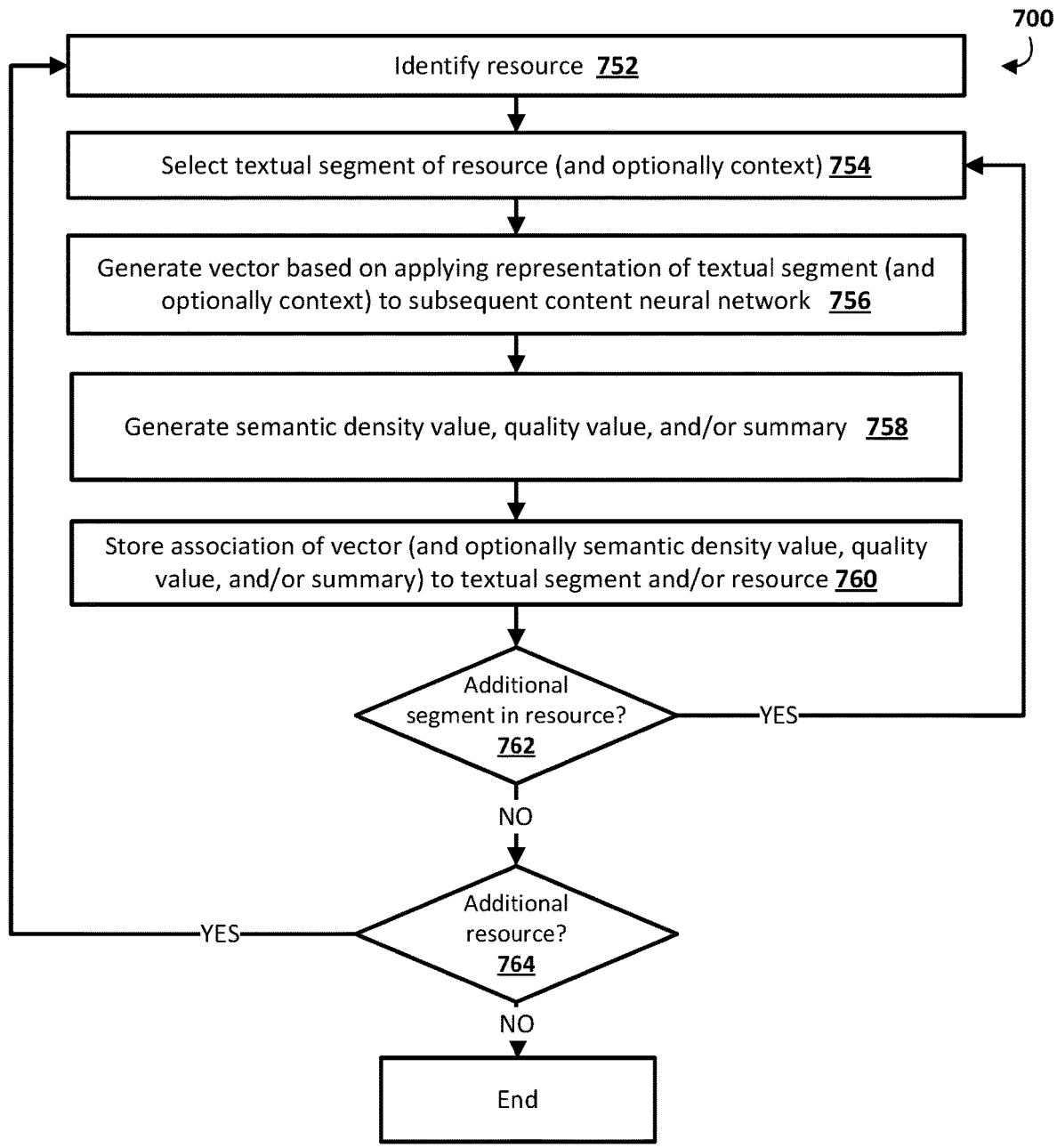
FIG. 7 is a flowchart illustrating a method of generating various feature for a content item, and storing the various features in association with the content item, according to various implementations disclosed herein.

Turning now to FIG. 7, a flowchart is provided that illustrates an example method 700 of generating various feature for a content item, and storing the various features in association with the content item, according to various implementations disclosed herein. For convenience, the operations of the flow chart are described with reference to a system that performs the operations. This system may include one or more components, such as one or more processors (e.g., CPU(s), GPU(s), and/or TPU(s)) of indexing system 107. While operations of method 700 are shown in a particular order, this is not meant to be limiting. One or more operations may be reordered, omitted or added.

At block 752, the system identifies a resource.

At block 754, the system selects a text segment of the resource. In some implementations, the system also selects context that is in addition to the selected text segment, such as additional text segment(s), metadata for the resource, and/or other context associated with the resource.

At block 756, the system generates a vector based on applying a representation of the text segment, and optionally representation(s) of the context, to a subsequent content neural network.

At block 758, the system generates a semantic density value, a quality value, and/or a summary for the text segment. In some implementations, the system generates the semantic density value based on applying the vector generated at block 756 to a semantic density model and/or generates the quality value based on applying the vector generated at block 756 to a quality model.

At block 760, the system stores an association of the vector to the text segment and/or the resource. In some implementations, the system also stores an association of the semantic density value, the quality value, and/or the summary to the text segment and/or the resource.

At block 762, the system determines whether there is an additional text segment in the resource that warrants indexing. If so, the system proceeds to block 754, and selects the additional text segment. The system then performs blocks 756, 758, and 760 for the additional text segment.

If, at block 762, the system determines there is not an additional text segment in the resource that warrants indexing, the system proceeds to block 764 and determines whether there is an additional resource to index. If so, the system proceeds back to block 752. If not, the indexing of block 700 ends (but may be restarted to index new or updated resources).

Figure 8:
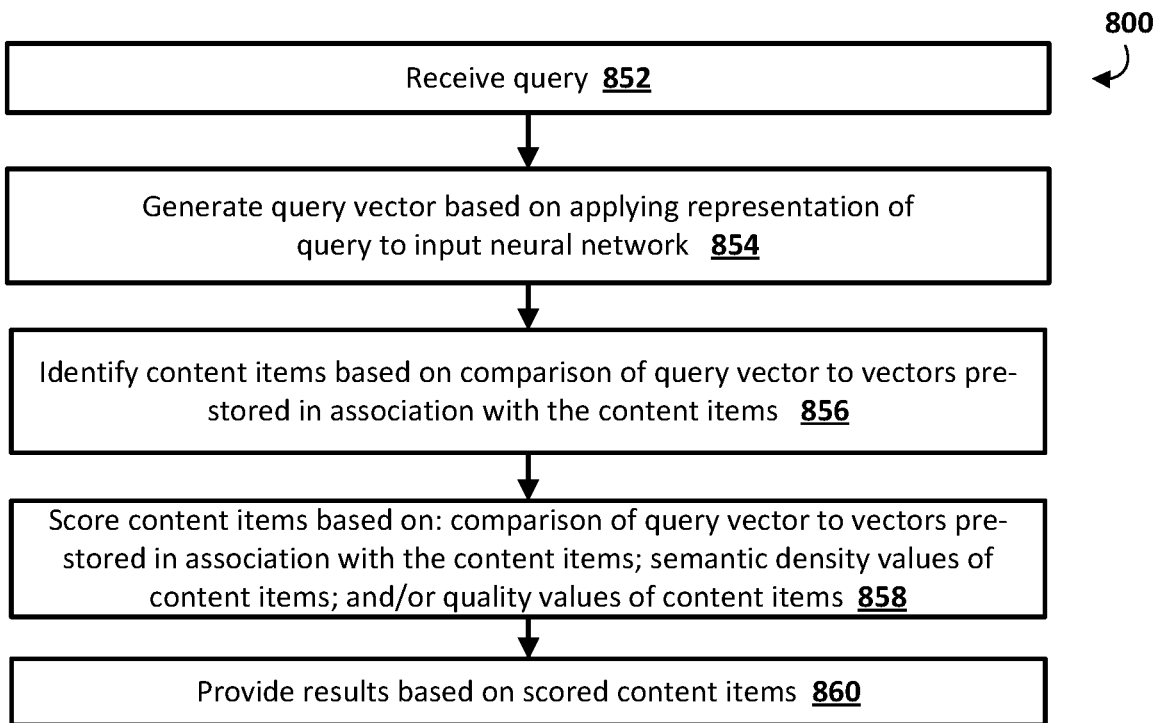
FIG. 8 is a flowchart illustrating a method of generating a query vector based on a received query, identifying content items that are responsive to the query based on comparison of the query vector to vectors stored in association with those content items, and providing results in response to the query that are based on the content items, according to various implementations disclosed herein FIGS. 9A and 9B each illustrate an example graphical user interface and an example of how results may be presented in response to a query.

Turning now to FIG. 8, a flowchart is provided that illustrates an example method 800 of generating a query vector based on a received query, identifying content items that are responsive to the query based on comparison of the query vector to vectors stored in association with those content items, and providing results in response to the query that are based on the content items, according to various implementations disclosed herein. For convenience, the operations of the flow chart are described with reference to a system that performs the operations. This system may include one or more components, such as one or more processors (e.g., CPU(s), GPU(s), and/or TPU(s)) of retrieval system 109. While operations of method 800 are shown in a particular order, this is not meant to be limiting. One or more operations may be reordered, omitted or added.

At block 852, the system receives a query.

At block 854, the system generates a query vector based on applying a representation of the query to an input neural network.

At block 856, the system identifies content items based on comparison of the query vector to query vectors pre-stored in association with the content items.

At block 858, the system scores the content items based on: comparison of the query vector to vectors pre-stored in association with the content items (e.g., based on a relevance value determined based on dot products); semantic density values of the content items; and/or quality values of the content items. The semantic density values and the quality values may also be pre-stored in association with the content items.

At block 860, the system provides results based on the scored content items. For example, the system may rank the content items based on the scores, and provide corresponding results based on the ranking. For example, the ranking may be utilized to determine what results to provide, what order to provide the results, etc. Each of the results may include, for example, the corresponding content item and a summary or other additional content that is from (or based on) the same resource as the corresponding content item.

Figure 9A:
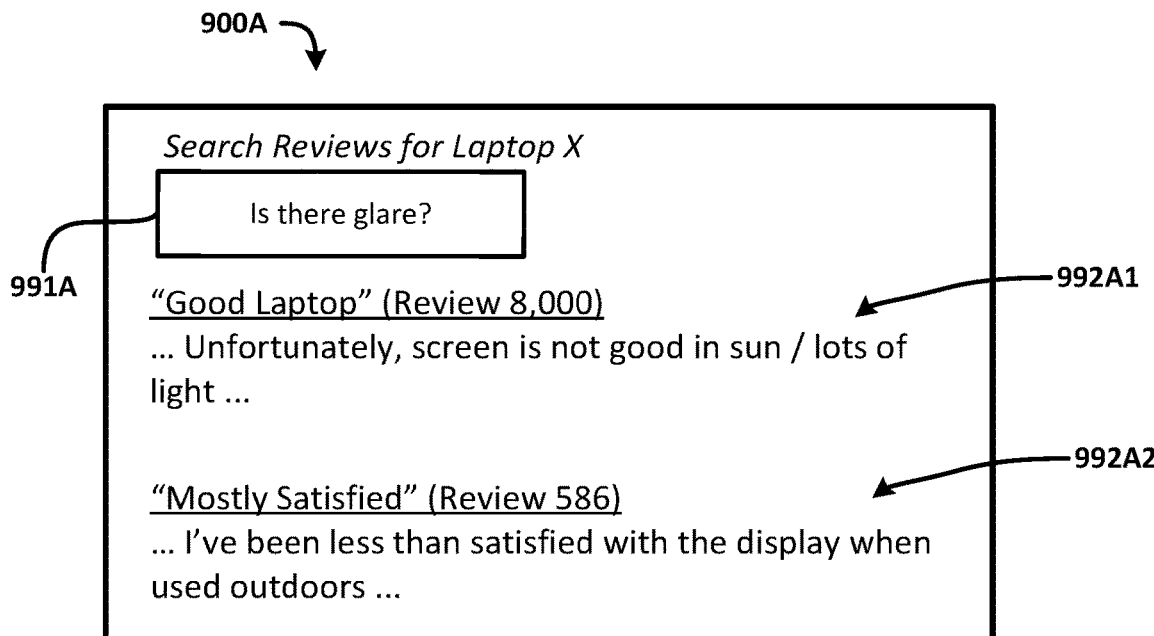
Figure 9B:
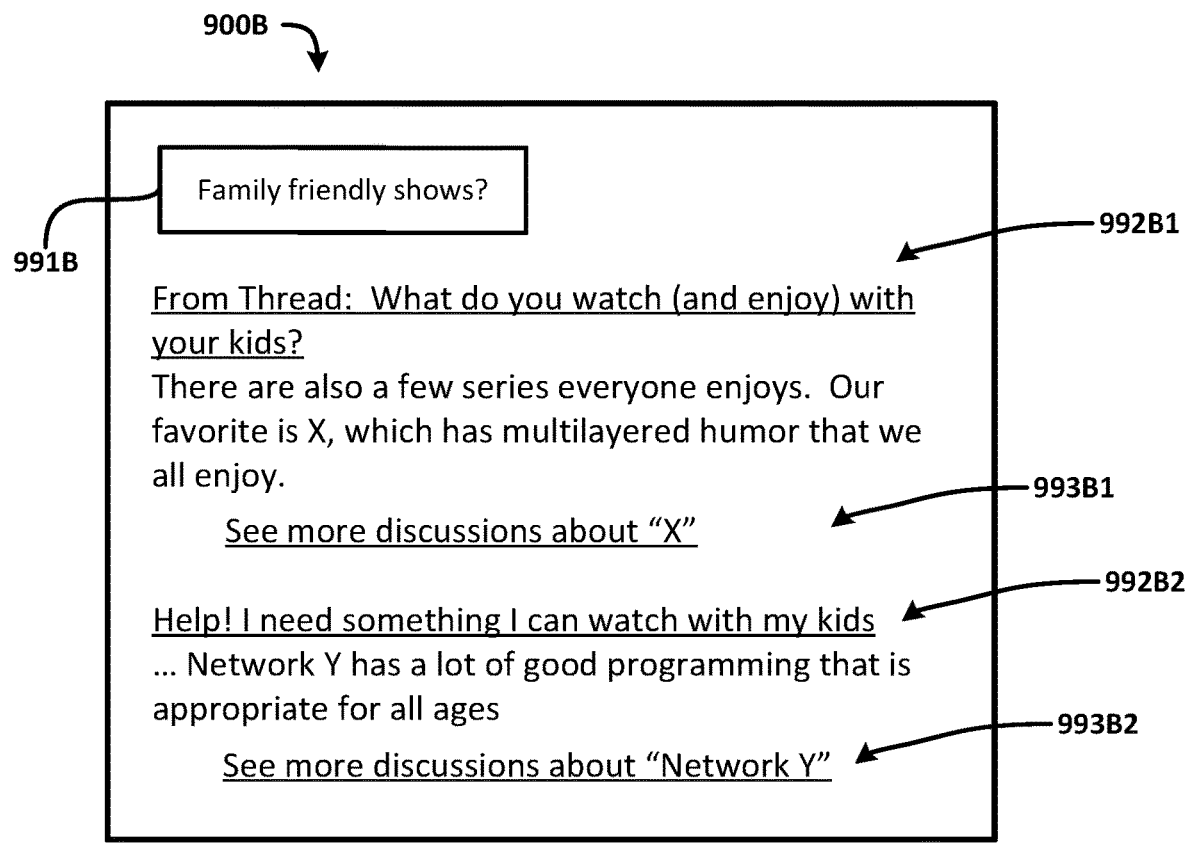

FIGS. 9A and 9B illustrate example graphical user interfaces 900A and 900B, each providing an example of how results may be presented in response to a query. In FIG. 9A, the query 991A of "Is there glare" is submitted by a user to search a corpus of content items. In particular, to search content items included in a corpus of "Reviews for Laptop X". The retrieval system 109 can generate a query vector based on the query 991A as described herein. Further, the retrieval system 109 can access index 175 to identify text segments that are included in the corpus of reviews. The retrieval system 109 can identify text segments that are relevant to the query based on comparing the query vector to corresponding vectors stored in association with those text segments in the index 175.

In FIG. 9A the retrieval system 109 has determined the text segment "Unfortunately . . . light" of result 992A1 and the text segment "I've been . . . outdoors" of result 992A2. The retrieval system 109 provides results 992A1 and 992A2 that each include a corresponding text segment, along with a title and review number of the corresponding review. Further the retrieval system provides the results 992A1 and 992A2 as hyperlinks, enabling the user to select either of the results and cause the user's computing device to navigate to the corresponding full review. In some implementations, the retrieval system 109 provides result 992A1 for presentation before result 992A2 based on a ranking of those results, which may be based at least in part on scores determined based on one or more of the values described herein.

It is noted in FIG. 9A that the textual segments of the results 992A1 and 992A2 are relevant to the query 991A, although the only matching term between the query and the textual segments is "is" (in textual segment of result 992A1). Such relevant textual segments can be determined based on techniques described herein with respect to training and/or use of the relevance model.

In FIG. 9B, the query 991B of "Family friendly shows" is submitted by a user to search content items. The retrieval system 109 can generate a query vector based on the query 991B as described herein. Further, the retrieval system 109 can identify text segments that are relevant to the query based on comparing the query vector to corresponding vectors stored in association with those text segments in the index 175.

In FIG. 9B the retrieval system 109 has determined the non-underlined text segments of results 992B1 and 992B2. The retrieval system 109 provides results 992B1 and 992B2 that each include a summary (in underlining). The summary of content can be pre-stored in association with the text segments in index 175 and/or determined based on summarization model 165 as described herein. Further the retrieval system provides the results 992B1 and 992B2 as hyperlinks, enabling the user to select either of the results and cause the user's computing device to navigate to the corresponding full review. In some implementations, the retrieval system 109 provides result 992B1 for presentation before result 992B2 based on a ranking of those results, which may be based at least in part on scores determined based on one or more of the values described herein.

In FIG. 9B, links 993B1 and 993B2 are also provided. Selection of either of the links 993B1 and 993B2 will cause the user's computing device to navigate to additional results that are similar to corresponding ones of 992B1 and 992B2. The clustering module 178 of retrieval system 109 may determine such results as described herein. For example, the clustering module 178 may determine text segments that are similar to the text segment of result 992B1 based on those text segments having associated pre-stored vectors that are similar to the vector of the text segment of result 992B1.

It is noted also in FIG. 9B that the textual segments of the results 992B1 and 992B2 are relevant to the query 991B, although there are no matching terms between the query and the textual segments. Such relevant textual segments can be determined based on techniques described herein with respect to training and/or use of the relevance model.

Figure 10:
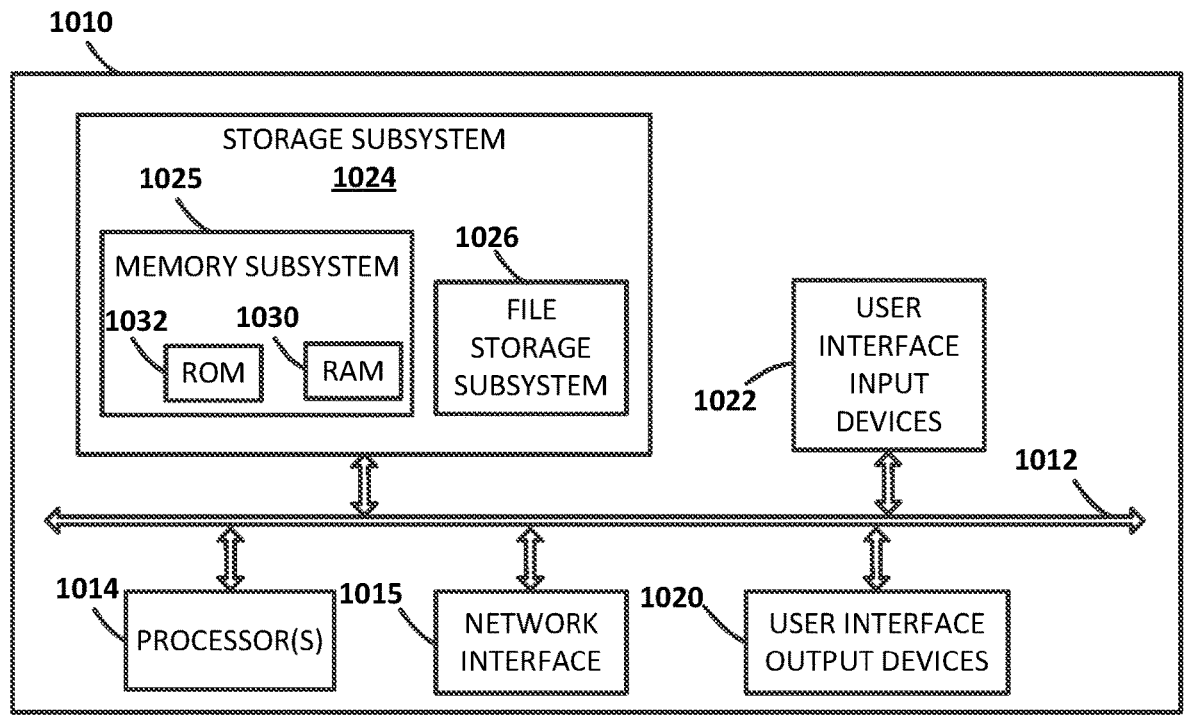
FIG. 10 illustrates an example architecture of a computing device.

FIG. 10 is a block diagram of an example computing device 1010 that may optionally be utilized to perform one or more aspects of techniques described herein. Computing device 1010 includes at least one processor 1014 (e.g., a CPU, GPU, and/or TPU) which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1015. The input and output devices allow user interaction with computing device 1010. Network interface subsystem 1015 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the method 600, the method 700, and/or the method 800.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving a textual query generated based on user interface input provided by a user via a client device of the user;
   applying a query representation of the textual query to a trained input neural network model;
   generating a query vector over the trained input neural network model based on applying the query representation to the trained input neural network model,
      wherein the trained input neural network model is trained based on backpropagation that is based on errors during training, each of the errors determined during the training as a function of:
         a corresponding training query vector generated over the trained input neural network model based on a corresponding training instance, and
         a subsequent content query vector generated over a separate subsequent content neural network model based on the corresponding training instance;
   determining responsive text segments to provide in response to the query based on comparison of the query vector to pre-stored vectors stored in association with the responsive text segments, the pre-stored vectors for each of the responsive text segments generated based on applying a representation of the text segment to the subsequent content neural network model;
   providing, to the client device in response to the query, results that are based on the responsive text segments.

2. The method of claim 1, wherein the comparison of the query vector to a given pre-stored vector of the pre-stored vectors is based on a result of a dot product of the query vector and the given pre-stored vector.

3. The method of claim 2, further comprising:
   scoring, based on the result of the dot product, a given text segment stored in association with the given pre-stored vector; and
   wherein the providing comprises providing, based on the scoring, a given result, of the results, that is based on the given text segment.

4. The method of claim 3, wherein scoring the given text segment further comprises:
   identifying a quality value that is pre-stored in association with the text segment; and
   scoring the given text segment based on both the result of the dot product and the quality value.

5. The method of claim 4, wherein the quality value is determined based on application of the given pre-stored vector to a trained quality neural network model.

6. The method of claim 3, wherein scoring the given text segment further comprises:
   identifying a semantic density value that is pre-stored in association with the text segment; and
   scoring the given text segment based on both the result of the dot product and the semantic density value.

7. The method of claim 3, wherein the given result includes the given text segment and a link to a given resource that contains the given text segment.

8. A system, comprising:
   memory storing instructions;
   one or more processors executing the instructions stored in the memory to cause the one or more processors to:
      receive a textual query generated based on user interface input provided by a user via a client device of the user;
      apply a query representation of the textual query to a trained input neural network model;
      generate a query vector over the trained input neural network model based on applying the query representation to the trained input neural network model,
         wherein the trained input neural network model is trained based on backpropagation that is based on errors during training, each of the errors determined during the training as a function of:
            a corresponding training query vector generated over the trained input neural network model based on a corresponding training instance, and
            a subsequent content query vector generated over a separate subsequent content neural network model based on the corresponding training instance;
      determine responsive text segments to provide in response to the query based on comparison of the query vector to pre-stored vectors stored in association with the responsive text segments, the pre-stored vectors for each of the responsive text segments generated based on applying a representation of the text segment to the subsequent content neural network model;
      provide, to the client device in response to the query, results that are based on the responsive text segments.

9. The system of claim 8, wherein the comparison of the query vector to a given pre-stored vector of the pre-stored vectors is based on a result of a dot product of the query vector and the given pre-stored vector.

10. The system of claim 9, wherein in executing the instructions one or more of the processors are further to:
    score, based on the result of the dot product, a given text segment stored in association with the given pre-stored vector; and
    wherein in providing results that are based on the responsive text segments, one or more of the processors are to provide, based on the scoring, a given result, of the results, that is based on the given text segment.

11. The system of claim 10, wherein in scoring the given text segment one or more of the processors are further to:
    identify a quality value that is pre-stored in association with the text segment; and
    score the given text segment based on both the result of the dot product and the quality value.

12. The system of claim 11, wherein the quality value is determined based on application of the given pre-stored vector to a trained quality neural network model.

13. The system of claim 10, wherein in scoring the given text segment one or more of the processors are further to:

identify a semantic density value that is pre-stored in association with the text segment; and score the given text segment based on both the result of the dot product and the semantic density value.

14. The system of claim 8, wherein the given result includes the given text segment and a link to a given resource that contains the given text segment.

* * * * *